United States Patent
Tan et al.

(10) Patent No.: US 11,379,998 B2
(45) Date of Patent: Jul. 5, 2022

(54) DETECTOR-TRACKER ARCHITECTURE

(71) Applicant: Zoox, Inc., Foster City, CA (US)

(72) Inventors: Qijun Tan, San Mateo, CA (US); Sarah Tariq, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/087,211

(22) Filed: Nov. 2, 2020

(65) Prior Publication Data

US 2021/0049776 A1   Feb. 18, 2021

Related U.S. Application Data

(63) Continuation of application No. 16/297,381, filed on Mar. 8, 2019, now Pat. No. 10,825,188.

(51) Int. Cl.
| | |
|---|---|
| *G06T 7/246* | (2017.01) |
| *G06K 9/62* | (2022.01) |
| *G06T 7/73* | (2017.01) |
| *G05D 1/00* | (2006.01) |

(52) U.S. Cl.
CPC ........... *G06T 7/248* (2017.01); *G05D 1/0088* (2013.01); *G06K 9/6228* (2013.01); *G06K 9/6232* (2013.01); *G06K 9/6262* (2013.01); *G06K 9/6289* (2013.01); *G06T 7/73* (2017.01); *G05D 2201/0213* (2013.01); *G06T 2207/20081* (2013.01); *G06T 2207/30252* (2013.01)

(58) Field of Classification Search
None
See application file for complete search history.

(56) References Cited

U.S. PATENT DOCUMENTS

| | | |
|---|---|---|
| 2017/0091950 A1 | 3/2017 | Munteanu et al. |
| 2017/0358086 A1* | 12/2017 | Dinu .................... G06V 10/454 |
| 2019/0391578 A1 | 12/2019 | Tariq et al. |
| 2020/0226469 A1 | 7/2020 | Dinu et al. |

\* cited by examiner

*Primary Examiner* — Dov Popovici
(74) *Attorney, Agent, or Firm* — Lee & Hayes, P.C.

(57) ABSTRACT

A machine-learning (ML) architecture may comprise a first ML model and/or an optical flow model that receive, as input, a first image and a second image. The first ML model may output a first feature map corresponding to the first image and a second feature map corresponding to the second image. The optical flow model may output an estimated optical flow. A deformation component may modify the second feature map, as a deformed feature map, based at least in part on the estimated optical flow. The deformed feature map and the first feature map may be concatenated together as a concatenated feature map, which may be provided to a second ML model. The second ML model may be trained to output an output ROI and/or a track in association with an object represented in the first image.

20 Claims, 9 Drawing Sheets

DETECTOR-TRACKER ARCHITECTURE

RELATED APPLICATIONS

This Application is a continuation of and claims priority to U.S. patent application Ser. No. 16/297,381, filed Mar. 8, 2019, which is incorporated herein by reference.

BACKGROUND

Computer vision is used in numerous applications, such as operating autonomous vehicles, identifying individuals for security purposes, etc. Computer vision techniques may include building software components that identify salient portions from an image, representing the salient portions of the image to the computer in a form that the computer can use to conduct further operations, and/or tracking objects. Current tracking systems may "lose" track of an object in a variety of situations. For example, an existing tracking system may lose track of an object by suddenly misclassifying the object because the object rotated in an unfamiliar way making it appear different or was otherwise temporarily occluded. In some cases, even if a detector correctly detects a same object that appears in two sequential images (e.g., by assigning the correct classification to the object and correctly identifying a region of the images that corresponds with the object), the tracking system may not be able to disambiguate whether the two detections correspond to a same object or two different objects of a same classification, particularly in cases where the appearance of the object in the images substantially changed between frames (e.g., due to the object rotating, due to partial occlusion of the object).

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
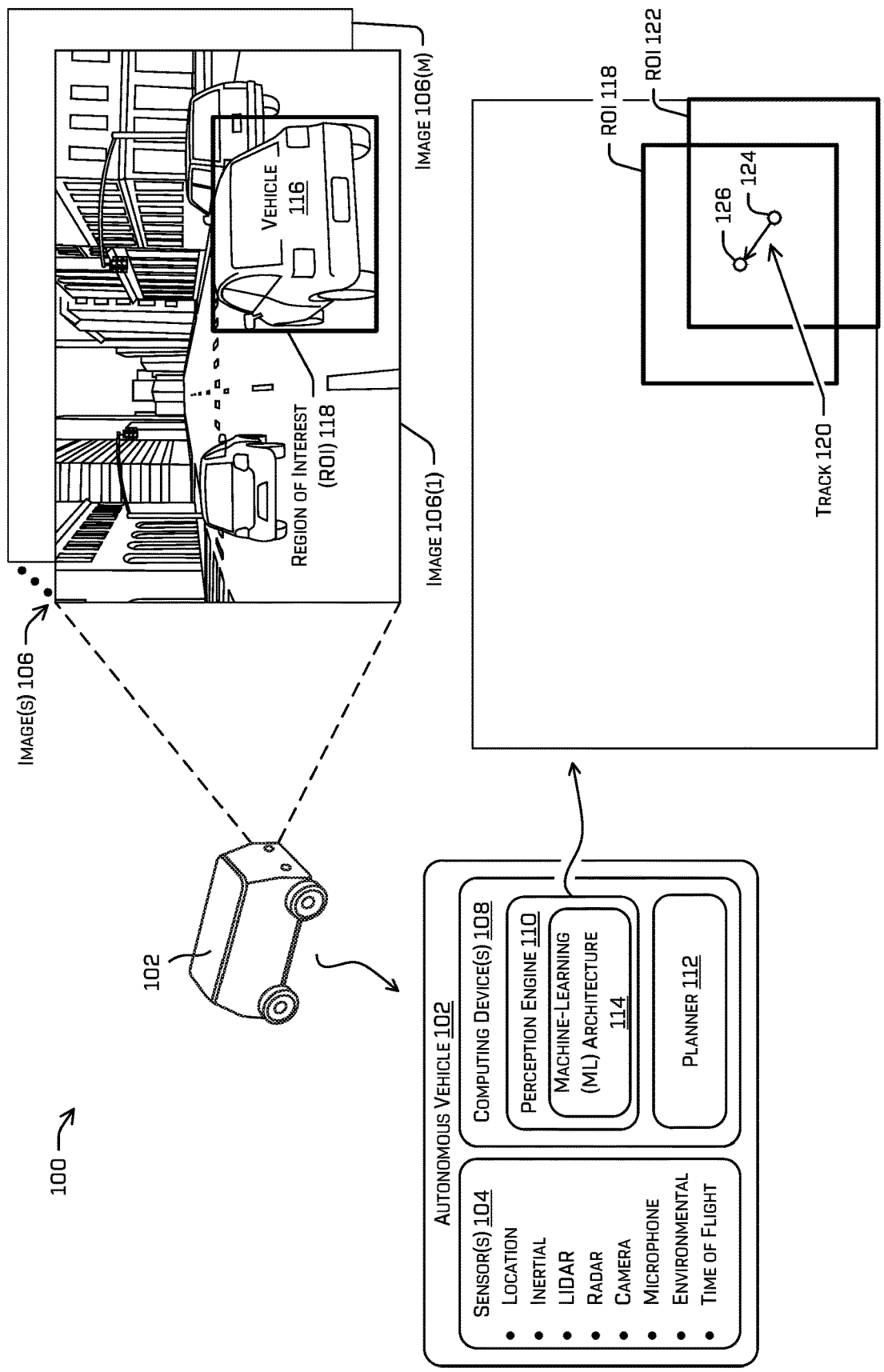
FIG. 1 illustrates an example scenario depicting an autonomous vehicle detecting an object in an environment and tracking that object.

The techniques discussed herein generally relate to detecting and tracking objects represented in sensor data (e.g., images, LIDAR data). The techniques discussed herein may improve computer vision by, for example, increasing the accuracy of object tracking and/or improve detections of objects, generally. This may result in continuously tracking an object without starting to track a different object (e.g., without losing track of an object), getting "stuck" on something other than an object (e.g., a waving tree, other background objects), and/or continuing to track the object when the object rotates, translates, changes size, or otherwise changes appearance in the image, regardless in changes in background, occlusions, and number of additional objects represented in sensor data.

In general, tracking an object may comprise determining whether an object that appears in a first image, captured at a first time, also appears in a second image, captured at a second time later than the first time. In some examples, a track may comprise an association between a first identification of the object in the first image and a second identification of the object in the second object. The track may additionally or alternatively include, for example, object velocities (either in pixel coordinates and/or environmental coordinates), historical object velocities (e.g., one or more previously determined object velocities), object accelerations, historical object accelerations, object extents, and the like.

For example, where a vehicle appears in a first image, it may be helpful to know whether a vehicle appearing in a second image received at some time after the first image is the same vehicle as in the first image, or a newly perceived vehicle. Tracking objects may be used to predict behavior of the object, to ensure decisions made regarding operation of a device take into account a track of an object, etc. Moreover, tracking an object may reduce redundant computation related to an object such as, for example, re-classifying an object, re-obtaining data related to an object (e.g., downloading additional information pertinent to an object), re-calculating an acceleration and/or other characteristics, etc.

The techniques discussed herein comprise an example architecture for detecting and/or tracking an object, based at least in part on image(s) received by the example architecture, that may improve the accuracy of the detections and/or tracks generated by the detector and/or tracker system. For example, the architecture discussed herein may accurately detect and/or track objects, even when an object is at least partially occluded, rotated, and/or otherwise altered compared to previous image(s) including a represent of the object. The architecture described herein may receive two images (e.g., a first image and a second image, where the first image was taken later in time than the second image) at a first ML model. The first ML model may be trained to output a first feature map associated with the first image and a second feature map associated with the second image. In some examples, a feature map output by the first ML model may comprise multiple regions of interest (ROIs) and/or confidence scores associated with an object represented in an image.

In some examples, the first ML model may comprise a backbone ML model and a detection portion. The backbone ML model may be configured to output one or more features based at least in part on image(s) received at the ML model and the detection portion may be configured to receive the one or more features and to output ROI(s) and/or confidence score(s) based at least in part on the one or more features. In some examples, the backbone ML model may be trained to receive two images as input, although in additional or alternate examples, the backbone ML model may be trained to receive one or more images as input. In some examples, the detection portion of the first ML model may comprise at least a first detection portion and a second detection portion where the first detection portion is trained based at least in part on feature maps generated based at least in part on most-recently received images (e.g., like the first image and the feature map generated by the backbone ML model for the first image) and the second detection portion is trained based at least in part on feature maps generated based at least in part on previously received images (e.g., like the second image and the feature map generated by the backbone ML model for the second image). In other words, at least in some examples, the backbone ML model may be trained using images, regardless of the images' relation in time to other images, but the first detection portion may be trained on "current" images and the second detection portion may be trained on "previous" images.

The architecture may additionally or alternatively comprise an optical flow ML model configured to receive the second image (i.e., whichever image was previously captured in respect to time) and output an indication of an optical flow between the second image and first image. For example, the indication of the optical flow may comprise a vector field over points in the image indicating the apparent displacement/movement of portions (e.g., pixels) between the second image and the first image. An optical flow may indicate a mapping of image data (e.g., brightness, color) associated with a first portion of a first image (e.g., a first pixel) to a second portion of a second image (e.g., a second pixel in the second image). In some examples, the techniques discussed herein may comprise providing the first image and the second image to the first ML model and the optical flow ML model. Based at least in part on these inputs, the first ML model may be configured to output a first feature map associated with the first image and a second feature map associated with the second image and the optical flow ML model may be configured to output an optical flow vector field.

The architecture may additionally or alternatively comprise a second ML model (e.g., for generating the final tracks and detections) configured to receive the first feature map and/or the second feature map. In some examples, the techniques may comprise deforming (e.g., warping (i.e., re-mapping), rotating, scaling, resampling) the second feature map, as a "deformed feature map," based at least in part on the optical flow vector field before providing the second feature map to the second ML model. In some examples, the techniques may additionally or alternatively comprise concatenating and/or otherwise aggregating the first feature map and the second (deformed, in some examples) feature map. The second ML model may receive the first feature map and/or the second (deformed) feature map (e.g., as a concatenated feature map, which may comprise a portion attributable to a deformed second feature map, in some examples) and/or a second concatenated feature map associated with a previous image (e.g., a concatenated feature map may have been generated for the second image based on feature maps associated with the second image and a third image). The second ML model may be trained to output an ROI, confidence score, and/or track in association with an object represented in at least the first image based at least in part on the first concatenated feature map and/or a second concatenated feature map.

Put simply, the second ML model may be trained to output both an ROI and a track in association with an object that is detected as being represented in an image, using temporal context present in the feature maps received at the second ML model. In other words, the second ML model may be trained to determine the ROI to associate with an object from among multiple ROIs present in the first feature map (and/or concatenated and/or warped feature map) and determine whether any ROIs from previous image(s) are associated with ROIs in the current image, i.e., thereby identifying a "track." In a non-limiting example, an output of the second ML model may additionally or alternatively comprise a confidence score associated with the ROI and/or the track.

For example, based at least in part on the first feature map, the second feature map, and/or the concatenated and/or deformed feature map, the second ML model may select (e.g., using a non-maximum suppression (NMS) algorithm), for association with an object represented in the first image, a first ROI from among a plurality of ROIs in the first feature map, and determine whether to associate the first ROI with a second ROI associated with the second image or an indication that the object associated with the first ROI has newly appeared within a FOV of an image sensor that captured the first image and the second image. The second ML model may be trained to make this selection and determination based at least in part on receiving the first feature map and/or the second feature map (e.g., concatenated together in some instances, where the second feature map may be deformed in some instances). In some examples, the second ML model may additionally or alternatively be trained to output a confidence score in association with a track output by the second ML model. The track output by the second ML model may comprise at least an indication of a current position of a representation of an object in the first image and a previous position of the representation of the object in a previous image (or an indication that the object newly appears in the FOV).

Whereas in some architectures a detector detects objects and provides these detections to a tracker for the tracker to determine whether or not to associate detections, the techniques discussed herein provide the raw features (indicated in the feature maps) generated by the first ML model (e.g., which may comprise a multitude of candidate ROIs) associated with multiple images to a second ML model that may select the ROIs and generate the track(s) based on the raw features for multiple images. The second ML model may thereby be trained on and operate using feature maps associated with multiple images (e.g., which may be associated with images that are subsequent in time relative to each other). In such an example, both detection and tracking may be improved, as such a network architecture may leverage information from both operations jointly.

Although, for the sake of clarity and comprehension, the discussion herein pertains to two images, it is understood that these concepts may be extended to three or more images. For example, the first ML model may comprise three or more detection portions, the optical flow ML model may be configured to output multiple optical flow vector fields between respective images, and/or the second ML model may be configured receive concatenated/aggregated feature maps associated with three or more images.

The ML models discussed herein may include a neural network, such as a random forest and/or boosted ensemble of decision trees; a directed acyclic graph (DAG) (e.g., where the nodes are organized as a Bayesian network); deep learning algorithm(s), such as artificial neural networks (ANN) (e.g., recurrent neural network (RNN), residual neural network (ResNet)), deep belief network (DBN), deep stacking network (DSN); etc. In some examples, the process of training the ML models may comprise training the first ML model and/or the optical flow ML model before training the second ML model.

The techniques discussed herein may improve the safety of system(s) that integrate the techniques discussed herein. For example, by implementing the techniques discussed herein as a sub-system of an autonomous vehicle, the autonomous vehicle may operate more safely and/or efficiently. The techniques may comprise controlling operation of the autonomous vehicle based at least in part on a detection and/or track.

Example Scenario

FIG. 1 illustrates an example scenario 100 including an autonomous vehicle 102 that detects multiple objects in an environment surrounding the autonomous vehicle from sensor data collected by one or more sensors (sensor(s) 104) of the autonomous vehicle 102. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to video games, manufacturing, augmented reality, etc.

According to the techniques discussed herein, the autonomous vehicle 102 may receive sensor data from sensor(s) 104 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, bariatric and/or other environmental signals, and/or a time of flight signal etc. For example, the autonomous vehicle 102 may receive one or more images, e.g., image 106(1)-image 106(m) (collectively image(s) 106), from the sensor(s) 104. The discussion herein primarily discusses images, for ease, but it is contemplated that the techniques may be applied to any sensor data that discretely represents an object (e.g., a LIDAR and/or RADAR point cloud including points that represent an object).

In some examples, the autonomous vehicle 102 may include computing device(s) 108 that may include a perception engine 110 and/or a planner 112. The perception engine 110 may include one or more ML models and/or other computer-executable instructions for detecting, identifying, segmenting, classifying, and/or tracking objects from sensor data collected from the environment of the autonomous vehicle 102. For example, the perception engine 110 may comprise the ML architecture 114 discussed herein for detecting and/or tracking object(s). In some instances, the perception engine 110 may receive sensor data from sensor(s) 104 of the autonomous vehicle 102, determine perception data from the sensor data, and transmit the perception data to a planner 112 for use by the planner 112 to localize a position of the autonomous vehicle 102 on a global map and/or a local map, determine one or more trajectories, control motion of the autonomous vehicle 102 to traverse a path or route, and/or otherwise control operation of the autonomous vehicle 102, though any such operation may be performed in various other components (e.g., localization may be performed by a localization engine, not shown). In some instances, the perception data may comprise an ROI and/or a general classification associated with an object detected from sensor data.

In the illustrated example, autonomous vehicle 102 may receive image(s) 106 (and/or other sensor data), which includes a representation of three vehicles, including a vehicle 116, and a variety of different environmental objects (e.g., roadway, sidewalk, trees, buildings). The ML architecture 114 may generate an ROI 118 based at least in part on detecting vehicle 116 as being represented in image(s) 106. In the illustrated example, the ROI 118 is a bounding box, although other techniques for identifying the ROI are contemplated. For simplicity and clarity, we limit the number of ROIs depicted in FIG. 1 to one, although it is understood that the ML architecture 114 may generate an ROI 118 for additional object(s) (e.g., traffic lights, traffic signs, vehicles, pedestrians, cyclists, animals).

In some examples, the ML architecture 114 may additionally or alternatively determine a track 120 of an object, such as vehicle 116. In some examples, the track may associate a current detected position of an object and a previously detected position of an object. The track may thereby be an indication that the ML architecture 114 is identifying two object detections as corresponding to a same object. Of course, though depicted in FIG. 1 as track 120, such depiction is merely for illustrative purposes and the track information for an object may comprise any data structure and/or format. For example, the illustrated track 120 may associated grid cells that generated ROI 118 and ROI 122, respectively, and/or centers of ROI 118 and/or ROI 122. ROI 122 may be associated with a previous image. In some examples, the grid cells that generate an ROI may be at the center of the ROI, although this may not always be the case (e.g., when the ROI is a mask or when the grid cell may be trained to produce an ROI that is off-center from the grid cell that produced the ROI). In the illustrated example, the track 120 may associate a center 124 of ROI 122 with a center 126 of ROI 118 and/or may, more generally, associate ROI 122 and ROI 118.

In some examples, a "center" of the object may be a center of an ROI associated with the object and/or a center that is otherwise calculated for the object (e.g., an estimation of the center of gravity of the object, a centroid of a segmentation (which may be an instance segmentation), etc.). It is contemplated that an additional or alternative point may be tracked other than the center.

Additionally or alternatively, the track 120 may comprise a current, predicted, and/or historical position, heading, velocity, acceleration, distance, ROI(s), and/or center of the object. In some examples, any of these characteristics may be real world values (e.g., a velocity of the object in the real world in meters per second, kilometers per hour, a heading relative to the sensor that captured them image) and/or image-relative characteristics (e.g., a velocity associated with movement of a representation of the object across images in pixels per second, a heading that identifies an angle of movement of the representation of the object in the image).

In some instances, the perception engine 110 may additionally or alternatively determine a position of the autonomous vehicle 102 determined by a localization engine (not pictured, which may use any sensor data to localize the autonomous vehicle 102), data related to objects in the vicinity of the autonomous vehicle 102, route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The data produced by the perception engine 110 (including the output(s) of ML architecture 114) may be collectively referred to as "perception data." Once the perception engine 110 has generated perception data, the perception engine 110 may provide the perception data, including the object detection(s) (e.g., ROI(s)) and/or track(s), to a planner 112.

In some instances, the planner 112 may use perception data, including the ROI(s) and/or track(s) to generate instructions for controlling operation of the autonomous vehicle 102. For example, the planner 112 may determine a route for the autonomous vehicle 102 from a first location to a second location; generate, substantially simultaneously, a plurality of potential trajectories for controlling motion of the autonomous vehicle 102 in accordance with a receding horizon technique (e.g., 1 micro-second, half a second) and based at least in part on an ROI and/or track to control the vehicle to traverse the route (e.g., in order to avoid any of the detected objects, as well as incorporate predictions of where such objects may be at points in the future); and select one of the potential trajectories as a trajectory of the autonomous vehicle 102 that may be used to generate a drive control signal that may be transmitted to drive components of the autonomous vehicle 102.

Example ML Architecture

Figure 2:
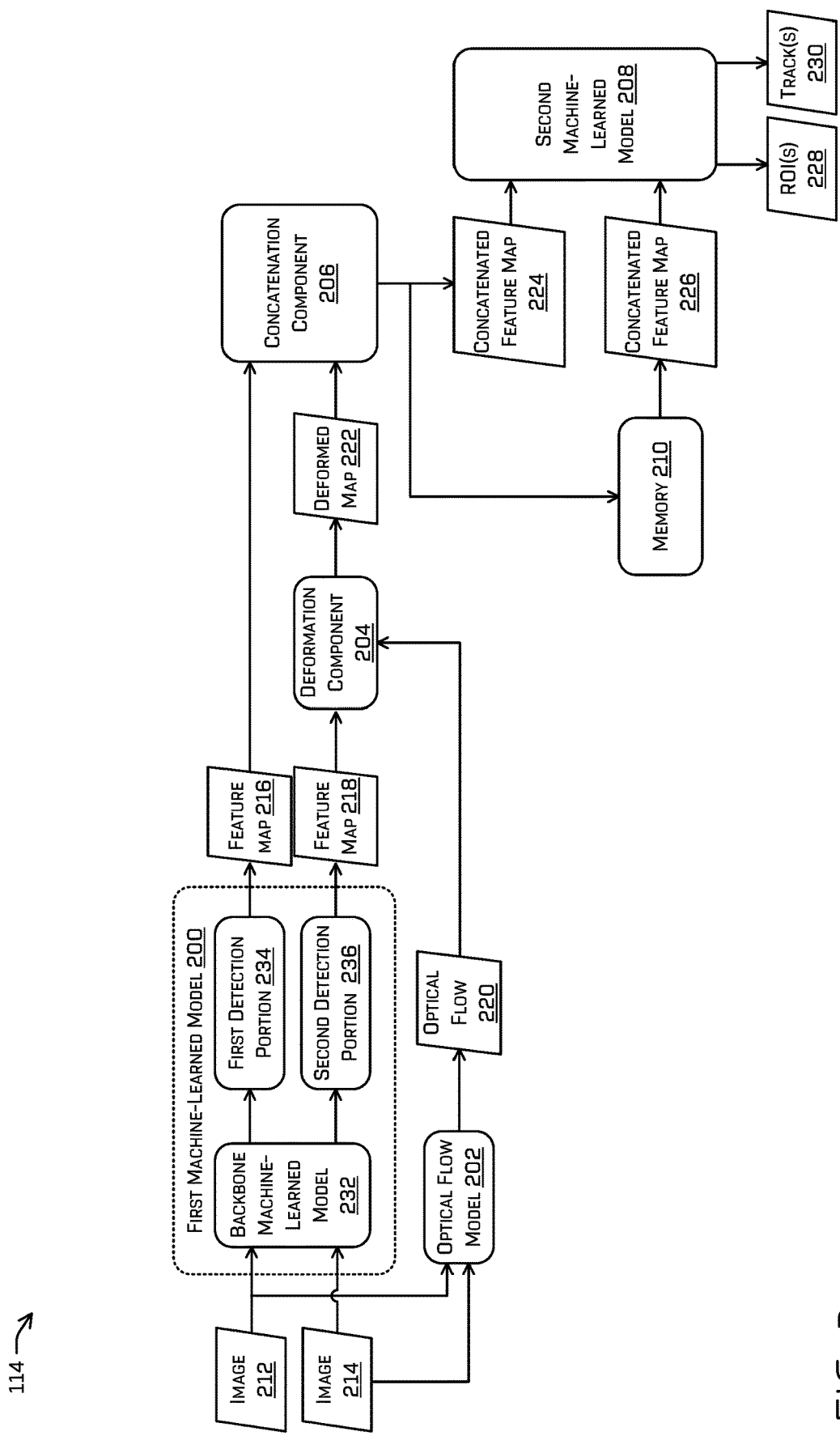
FIG. 2 illustrates a block diagram of an example architecture of a detector-tracker machine-learning model.

FIG. 2 illustrates additional details regarding ML architecture 114 for detecting and/or tracking objects represented in sensor data. In some examples, the ML architecture 114 may comprise a first ML model 200, an optical flow model 202, a deformation component 204, a concatenation component 206, and/or a second ML model 208. In some examples, the ML architecture 114 may have access to a memory 210. In some examples, the first ML model 200, optical flow model 202, deformation component 204, concatenation component 206, and/or second ML model 208 may comprise instructions stored on the memory 210, hardware (e.g., application-specific integrated circuit (ASIC)), and/or some combination thereof (e.g., field-programmable gate array (FPGA)).

The first ML model 200, optical flow model 202, deformation component 204, concatenation component 206, and/or second ML model 208 may comprise a neural network, such as a random forest and/or boosted ensemble of decision trees; a directed acyclic graph (DAG) (e.g., where the nodes are organized as a Bayesian network); deep learning algorithm(s), such as artificial neural networks (ANN) (e.g., recurrent neural network (RNN), you only look once (YOLO) v2/v3 and/or other variants, residual neural network (ResNet)), deep belief network (DBN), deep stacking network (DSN); etc. Although discussed in the context of neural networks, any type of machine-learning may be used consistent with this disclosure. For example, machine-learning algorithms may include, but are not limited to, regression algorithms, instance-based algorithms, Bayesian algorithms, association rule learning algorithms, deep learning algorithms, etc. Additional or alternative examples of neural network architectures may include neural networks such as ResNet50, ResNet101, VGG, DenseNet, PointNet, and the like.

In some examples, the first ML model 200 and/or the optical flow model 202 may receive sensor data from one or more sensors. For example, the sensor data may comprise image 212 and/or image 214, although the sensor data may comprise additional or alternate types of sensor data such as, for example, voxel(s) generated from LIDAR data. In some examples, image 212 and image 214 may have been captured by a same image sensor. Image 212 may have been captured at a first time that is subsequent to a second time at which image 214 was captured. For example, image 212 and image 214 may be consecutive frames in images captured by an image sensor, although in additional or alternate examples, the images do not need to be consecutive. Image 212 and/or image 214 may comprise an image such as, for example, a grayscale image, a red-green-blue (RGB) image, a time of flight image, a depth image, an infrared image, an image of LIDAR points (and/or other three or more dimensional sensor data points) projected into a two-dimensional space, and/or any combination thereof.

The first ML model 200 may be trained to output feature maps for each of the images received by the first ML model 200. For example, the first ML model 200 may output a feature map 216 associated with image 212 and a feature map 218 associated with image 214. A feature map output by the first ML model 200 may comprise feature(s) associated with different portions of an image). In some examples, the feature map 216 and/or feature map 218 may comprise a tensor comprising representation(s) of operations conducted by the first ML model 200 on input data (i.e., image 212 or image 214 respectively), depending on the type of ML model(s) of the first ML model 200. As a non-limiting example, each feature map may comprise an image-like representation in which each "pixel" of the intermediate output is associated with a vector having a dimension of 128 which describes a pixel or region of the input image.

The optical flow model 202 may be configured to generate an optical flow 220 based at least in part on receiving the image 212 and the image 214, which may comprise a vector field mapping portions of image 212 to image 214 (e.g., indicating the displacement of pixels between image 212 and image 214. The optical flow model 202 may be trained based at least in part on a ground truth optical flow determined by a computationally-expensive algorithm (e.g., Lucas-Kanade, Open CV's optical flow library) for a set of training images. In some examples, the optical flow 220 may be upsized and/or downsized to match a size of feature map 218.

The deformation component 204 may receive the optical flow 220 and modify the feature map 218 based at least in part on the optical flow 220 (i.e., the feature map that corresponds with the image that was earlier in time, which in this example is image 214) to obtain a deformed map 222. For example, deforming the feature map 218 may comprise determining that a vector (indicated by the optical flow 220) is associated with a location in the feature map and mapping data associated with that location in the feature map to a second location in the deformed feature map, according to the vector. The deformed feature map may have a same dimension as the original feature map, so the first location in the original feature map corresponds to a same first location in the deformed feature map and the second location in the deformed feature map corresponds to a second location in the original feature map.

In some examples, the optical flow model 202 may determine an additional or alternate transform suitable to deform a feature map associated with a feature map 218 so that features represented in feature map 218 have a same or similar spatial representation to corresponding features of feature map 216. For example, this transform may be based at least in part on a heading, velocity, acceleration, distance, ROI, and/or classification associated with an object.

In some examples, output(s) of layers of the first ML model 200 may be concatenated at the concatenation component 206. For example, the concatenation component 206 may concatenate and/or otherwise amalgamate the feature map 216 and/or the deformed map 222 to obtain a concatenated feature map 224. In at least some examples, such a concatenation may comprise creating a single tensor of both the feature map 216 and the deformed map 222. The concatenated feature map 224 may be provided as input to the second ML model 208. In some examples, the second ML model 208 may additionally or alternatively receive a concatenated feature map 226 from memory 210 associated with a previous image. For example, whereas concatenated feature map 224 was generated based at least in part on image 212 and image 214 (which was captured at a time previous to a time at which image 212 was captured), concatenated feature map 226 may have been generated for a previous set of images such as, for example, image 214 and an unillustrated image that was captured at a time previous to a time at which image 214 was captured.

The second ML model 208 may be trained to output ROI(s) 228 and/or track(s) 230 based at least in part on the concatenated feature map 224 and/or the concatenated feature map 226. For example, the second ML model 208 may ultimately output an ROI, track, ROI confidence score associated with the ROI, and/or confidence score associated with the track in association with an object detected by the second ML model 208. In some examples, an ROI may identify a portion of an image (and/or other sensor data) as corresponding to an object such as, for example, a pedestrian, vehicle, traffic sign, etc. In at least some examples, such identification may comprise a set (e.g., vector) of probabilities that the ROI corresponds to one or more classifications. For example, the ROI may comprise a center and dimensions of a shape, such as a rectangle (i.e., a bounding box), and/or any other identification of a portion of the image attributable to an object, and/or uncertainties associated therewith. A confidence score may be a probability indicating a likelihood that the offset coordinate(s) and/or extents of the ROI fits the object (e.g., the ROI is associated with an intersection over union (IOU) that meets or exceeds a threshold IOU or that is an IOU that is greater than IOUs associated with other ROIs). The second ML model 208 may additionally or alternatively determine a confidence score associated with a track.

In some examples, the second ML model 208 may make a number of intermediate determinations before outputting the final (output) ROI(s) 228 and/or track(s) 230. For example, the second ML model 208 may generate, based at least in part on the concatenated feature map 224, a plurality of candidate ROIs and/or confidence scores associated therewith, and a plurality of candidate tracks and/or confidence scores associated therewith. In other words, the second ML model 208 may "look" (e.g., according to the stride of the second ML model 208) at a portion of the concatenated feature map 224 and determine a candidate ROI, ROI confidence score, candidate track, and track confidence score associated with that portion. In some examples, this process may be applied for each portion of the concatenated feature map 224. In additional or alternate examples, the second ML model 208 may generate the plurality of candidate ROIs, plurality of candidate tracks, and/or respective confidence scores for each anchor box (e.g., each discrete portion may be associated with a plurality of proposed ROIs, each proposed ROI being an anchor). In other words, the second ML model 208 may determine a first set of candidate ROIs, candidate tracks, and/or respective confidence scores for a first anchor box; a second set of candidate ROIs, candidate tracks, and/or respective confidence scores for a second anchor box; and so on, for as many anchor boxes as the second ML model 208 is configured for. In some examples, the number of anchor boxes may correspond to a number of object classifications for which the second ML model 208 has been trained to output ROIs (e.g., pedestrian, four-wheeled vehicle, cyclist, traffic signage), a number of ROI shapes, and or any other feature which may be used to discretize, segment, and/or classify the input data.

Figure 3A:
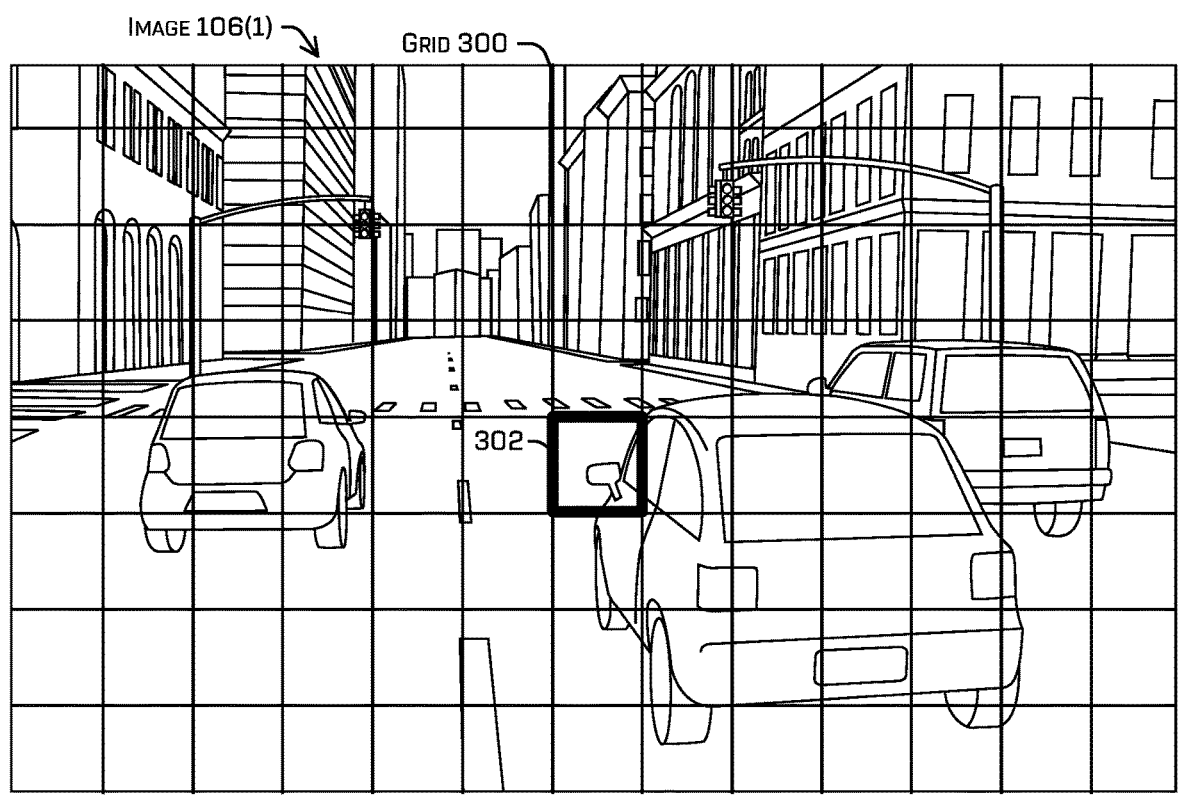
FIG. 3A illustrates an example image and how such an image may be discretized as an output grid.
Figure 3C:
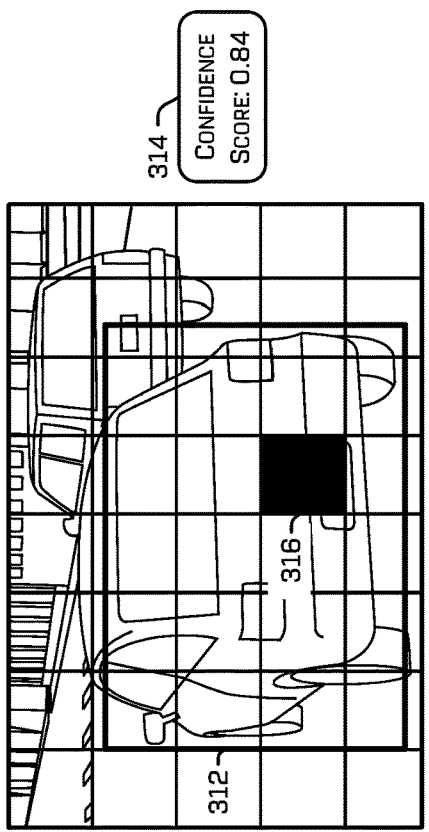
FIGS. 3B-3E illustrate example regions of interest (ROIs), confidence scores, and portions of the image for which the ROIs were generated. A first machine-learning (ML) model may generate one or more feature maps comprising such ROIs and/or confidence scores.
Figure 3E:
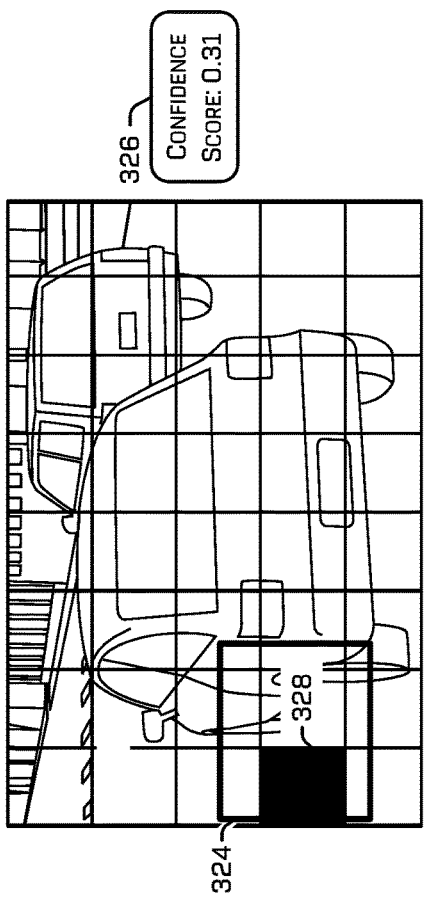
Figure 3B:
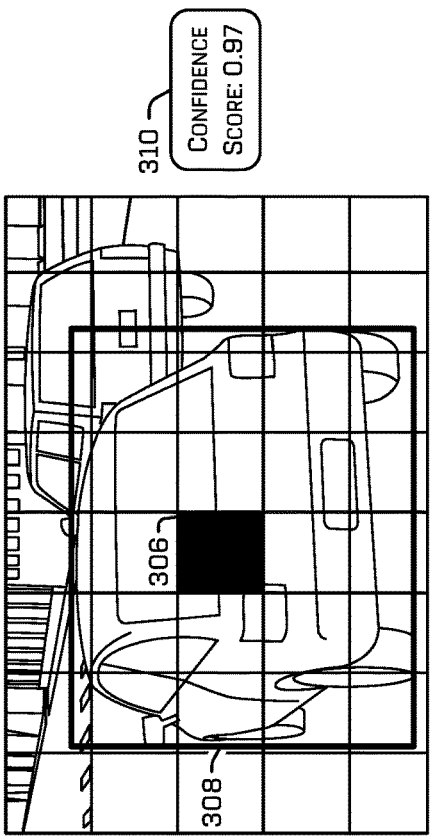

As discussed in more detail regarding FIGS. 3A and 3B, the number of candidate ROIs and/or confidence scores generated by the second ML model 208 may correspond to a discrete location at which the second ML model 208 "looks" (e.g., a number of cells of an output grid), which may number in the thousands, hundreds of thousands, or even millions. The number of candidate ROIs that overlap at least part of a representation of an object in an image may therefore be in the tens, hundred, thousands, or even millions, depending on how much of the FOV is occupied by the object.

The second ML model 208 may be trained to determine one ROI, from among multiple ROIs, to output in association with an object. This determination may comprise conducting a non-maximum suppression calculation. The second ML model 208 may additionally or alternatively be trained to generate a track in association with the output ROI and/or generate a candidate track in association with each candidate ROI, in which case, the output track may be the candidate track associated with the candidate ROI chosen as the output ROI. In some examples, the track may either be a new track or the track may identify a former track (i.e., a track generated for a previous image). In other words, the new track may indicate that the object associated with the output ROI has newly entered a FOV of an image sensor that captured image 212 and image 214 (or newly become un-occluded within the FOV, which is within the intention of entering the FOV in this case), whereas if the track identifies a former track (e.g., a track generated for image 214 and/or further previous image), the track identifies the object associated with the output ROI as being the same object as has been previously identified by a previous ROI (e.g., an ROI generated in association with image 214 during a previous iteration of operation of the second ML model 208).

In other words, the second ML model 208 may be trained to both determine a final (output) ROI and/or confidence score to output in association with an object (from among multiple ROIs associated with the object) and to generate a track associated with the output ROI (e.g., which may indicate that the object has newly appeared in the FOV or that the ROI is associated with a previous track and/or ROI). Since the second ML model 208 receives a concatenated feature composed of feature maps generated for a current frame and a previous frame, the second ML model 208 determines the ROI(s) 228 and/or the track(s) 230 based at least in part on, not only the output ROI, but also the candidate ROIs that aren't ultimately output and the features and/or candidate ROIs of the previous image, which provides temporal context for the determinations made by the second ML model 208.

Returning to each of the elements of ML architecture 114 in more detail, the first ML model 200 may comprise a backbone ML model 232, which may comprise multiple layers, one or more of which may generate an output. A layer of the backbone ML model 232 may conduct a regression task, convolution task, pooling task, etc. based at least in part on an input received at the layer (e.g., at least a portion of the image for an input layer, an output of a previous layer for a hidden layer), and according to the structure and parameters of the backbone ML model 232. The backbone ML model 232 may be trained to receive an image as input and output a feature representation (unillustrated) of the image. This feature representation may comprise a tensor, for example. One or more layers of the backbone ML model 232 may output the feature representation to a detection portion of the first ML model 200.

In some examples, a feature representation determined for an image by the backbone ML model 232 may be stored, at least temporarily, in memory 210 to reduce redundant computation. Accordingly, a feature representation of image 212 may be generated by backbone ML model 232, stored in memory 210, and/or provided to first detection portion 234, and second detection portion 238 may retrieve a feature representation of image 214 from memory 210 (e.g., instead of the backbone ML model 232 re-generating the feature representation of image 214).

In some examples, the backbone ML model 232 may be trained using a corpus of images, whereby the training may be agnostic to the images' temporal relationships. In other words, the backbone ML model 232 may be trained to output a feature representation, regardless of whether the input image was taken before or after another image.

In some examples, the backbone ML model 232 may be trained first, before the first detection portion 234, second detection portion 236, optical flow model 202, and/or second ML model 208 are trained. However, loss calculated for the second ML model 208 may be backpropagated, end-to-end, from the second ML model 208 through the first detection portion 234 and/or second detection portion 236 to the backbone ML model 232 (and additionally or alternatively to the optical flow model 202). Training these components by backpropagating the loss may comprise modifying (e.g., tuning) one or more parameters of the backbone ML model 232, the first detection portion 234, second detection portion 236, optical flow model 202, and/or second ML model 208 to minimize the loss. In at least some examples, for example, though the first detection portion 234 and the second detection portion 236 may comprise the same architecture, end-to-end backpropagation may result in differing parameters between the two. It is also contemplated that individual models discussed herein may be trained by piecemeal backpropagation (e.g., backpropagating the loss to one component at a time).

Although the discussion here attempts to explain the content of some of the feature representation, it is understood that the feature representation (and/or feature map 216 and/or feature map 218) may not be described in humanly-comprehensible terms, as the feature representation (and/or feature maps) may comprise an output that may be a computer and/or neural network transformation of the image 212 and/or image 214. As such, the feature representation (and/or feature maps) may comprise a high-dimensional field of values generated by layer(s) of the backbone ML model 232.

In some examples, the backbone ML model 232 may generate a first feature representation associated with the image 212 and a second feature representation associated with the image 214. The backbone ML model 232 may receive image 214 before image 212. The backbone ML model 232 may be trained to receive image(s) and/or output feature representations(s) in parallel, although, in at least one example, the backbone ML model 232 may output a feature representation as an image is received. In other words, since image 214 was captured before image 212, backbone ML model 232 may sequentially output a first feature representation associated with image 214 then a second feature representation associated with image 212, either of which may be stored in memory 210, at least temporarily, for retrieval by downstream components of the ML architecture 114.

In some examples, the first ML model 200 may comprise one or more detection portions. In at least one example, the first ML model 200 may comprise a number of detection portions equal to the number of images processed by the ML architecture 114 in order to generate an ROI, track, and/or confidence scores in association with one image. For example, the ML architecture 114 may be designed to output an ROI, track, and/or confidence score for one image based at least in part on two input images, although, in other examples, the ML architecture may be designed to output an ROI, track, and/or confidence for one image based at least in part on one, three, or more images. In the depicted example, the ML architecture 114 generates an ROI, track, and/or confidence score based at least in part on two images. The first ML model 200 may accordingly comprise a first detection portion 234 and/or a second detection portion 236.

In some examples, the first detection portion 234 may be trained to receive a feature representation output by the backbone ML model 232 associated with a "current" image (i.e., image 212 in this example) and to output a feature map 216 based at least in part on that feature representation. Similarly, the first detection portion 234 may be trained to receive a feature representation output by the backbone ML model 232 associated with a "previous" image (i.e., image 214 in this example) and to output a feature map 218 based at least in part on that feature representation. As discussed above, the feature map output by the first detection portion 234 and/or the second detection portion 236 may comprise a tensor comprising abstract representations of image 212 and image 214, respectively.

In some examples, the first detection portion 234 and/or the second detection portion 236 may be trained identically (e.g., the first detection portion 234 and the second detection portion 236 are one structure that is iteratively run for the image 212 and the image 214).

However, in another example, the first detection portion 234 may comprise a first structure associated with first parameters and/or the second detection portion 236 may comprise a second structure associated with second parameters, where the first structure and the second structure are the same but at least one of the first parameters is different that a corresponding parameter of the second structure. In some examples, the first structure may be parallel to the second structure in the pipeline of the architecture 114. For example, the first detection portion 234 and the second detection portion 236 may comprise a same number and type of layers (e.g., convolutional, pooling, anchor boxes, e.g., three convolutional layers and nine different anchor boxes) having the same hyperparameters (e.g., number of filters, spatial extent, stride, amount of zero padding), but a parameter of the three convolutional layers of the first detection portion 234 may be different than a parameter of the three convolutional layers of the second detection portion 236.

A parameter, in contrast to a hyperparameter, may comprise any parameter that is modified during training such as, for example, a weight associated with a layer or components thereof (e.g., a filter, node). So, while the number of filters, spatial extent, stride, anchor boxes, layer types, layer connections, input size (e.g., tensor received from the backbone ML model 232 having dimensions $W_1 \times H_1 \times D_1$) and/or type, output size and/or type (e.g., tensor having dimensions $W_2 \times H_2 \times D_2$), etc. would be the same for the first detection portion 234 and the second detection portion 236, parameters associated with components thereof may be different between the first detection portion 234 and the second detection portion 236. Although various examples of hyperparameters are given herein, it is contemplated that one or more of the hyperparameters may be parameters, depending on the training method.

In some examples, the first detection portion 234 and the second detection portion 236 may be trained by modifying the parameters thereof to minimize a loss determined for output(s) of the second ML model 208 and backpropagated to the first detection portion 234 and the second detection portion 236. Accordingly, a first feature map determined based at least in part on the feature representation of image 212 determined by the first detection portion 234 may differ from a second feature map determined by the second detection portion 236 for the same feature representation of image 212 (as the network paths may differ from the output back to the detection portions). Training the first detection portion 234 and second detection portion 236 in this manner (e.g., to have the same structure but different parameters) increases the accuracy of the ROI(s) 228 and/or track(s) 230 in at least some examples. In one or more examples herein, such a feature map may be referred to as an "intermediate output" or "intermediate values," as such determined features are output from one portion of the network (the first ML model) into a second (the second ML model).

The subsequent figures illustrate further details associated with the concepts enumerated above and add further details thereto.

Example Regions of Interest (ROIs) Generation by First ML Model

FIG. 3A illustrates image 106(1) and an example output grid 300, where each cell of the output grid 300 is associated with a portion of the image 106(1). According to this example, image 106(1) may correspond with image 212 of FIG. 2. One example location 302 (equivalently, "cell") of the image is emphasized (bolded) near the center of the image 106(1). It is contemplated that, as discussed herein, a location in the image may include a single pixel of the image and/or a collection of pixels of the image. Note that, although the discussion that follows describes a grid and cells, the use of such terminology and illustration is merely for the sake of clarity and a very rudimentary manner of visualizing the perceptive field of the ML models discussed herein (e.g., the various portions of the image "seen" by different portions of the ML model). The ML models discussed herein may or may not make any determination to generate such a grid and/or cells.

The number of locations (and correspondingly the ROIs and/or confidence scores generated in association with those locations) may be equal to the number of pixels of the image multiplied by the number of anchor points and divided by the stride size (and divided by the scale factor if the image was scaled down by the backbone ML model 232). A detection portion may be trained to generate an ROI and/or confidence score for a grid cell based at least in part on the input feature representations. In some examples, each grid cell may be associated with an ROI and/or confidence score. In an example where the image is a 1920×1200 two-dimensional image and the backbone ML model has a stride of 8 and 9 anchor points, the number of grid cells (and corresponding ROIs and/or confidence scores) may be 324,000 (i.e., $(9 \cdot 1920 \cdot 1200)/8^d$), where d is the number of dimensions of the input sensor data (e.g., d may be 2 for an two-dimensional image, 3 from a depth image and/or LIDAR data, or more if the image sensor data contains additional dimensions). If the backbone ML model 232 scaled an image down by a factor of 8, the number of ROIs and/or confidence scores (and corresponding grid cells) output by a detection portion would still be 40,500 (i.e., 324,000/8). The output grid 300 depicted in FIG. 3A is therefore much simplified in comparison to the example output grid discussed above and implemented by the ML architecture 114. First ML model 200, the components of the first ML model 200, optical flow model 202, and/or second ML model 208 may generate outputs in association with cells of the output grid 300.

FIGS. 3B-3E depict ROIs and confidence scores generated in association with respective locations within image 106(1). The first ML model 200 may be trained to output a feature map comprising an ROI and/or confidence score in association with a location in the image. This feature map may comprise at least one ROI and/or confidence score in association with a location in the image. However, in at least some examples, the first ML model 200 may be trained to output an ROI and/or confidence score for up to each location in the image (e.g., for each cell of the output grid). FIGS. 3B-3E depict four such locations, ROIs, and confidence scores.

For example, FIG. 3B depicts a location 306 associated with an ROI 308 and/or confidence score 310. In some examples, second ML model 208 may be configured to generate ROI 308 and/or confidence score 310 based at least in part on a portion of the concatenated feature map 224 corresponding to location 306. In the depicted example, we assume that ROI 308 was selected for output according to a non-maximum suppression calculation, which is discussed in more detail regarding FIG. 4.

Figure 3D:
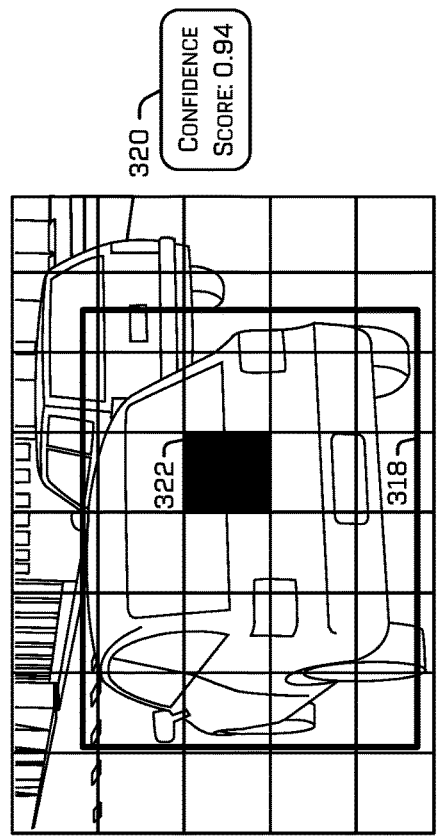

Similarly, FIG. 3C depicts an ROI 312 and confidence score 314 generated by the first ML model 200 in association with a different location 316; FIG. 3D depicts an ROI 318 and confidence score 320 generated by the first ML model 200 in association with a further different location 322; and FIG. 3E depicts an ROI 324 and confidence score 326 generated by the first ML model 200 in yet another location 328. In some examples, second ML model 208 may be configured to generate ROI 312 and/or confidence score 314 based at least in part on a portion of the concatenated feature map 224 corresponding to location 316, ROI 318 and/or confidence score 320 based at least in part on a portion of the concatenated feature map 224 corresponding to location 322, and so on. Note that confidence score 314 is appropriately lower than confidence score 310 and confidence score 320 since the "fit" of the ROI 312 to the extents of the depiction of the vehicle is poorer than those of ROI 308 and ROI 318. Also, the confidence score 326 is appropriately very low in comparison to the other depicted confidence scores since the location 328 is far from the center of the vehicle and the ROI 324 poorly fits the vehicle.

Figure 3F:
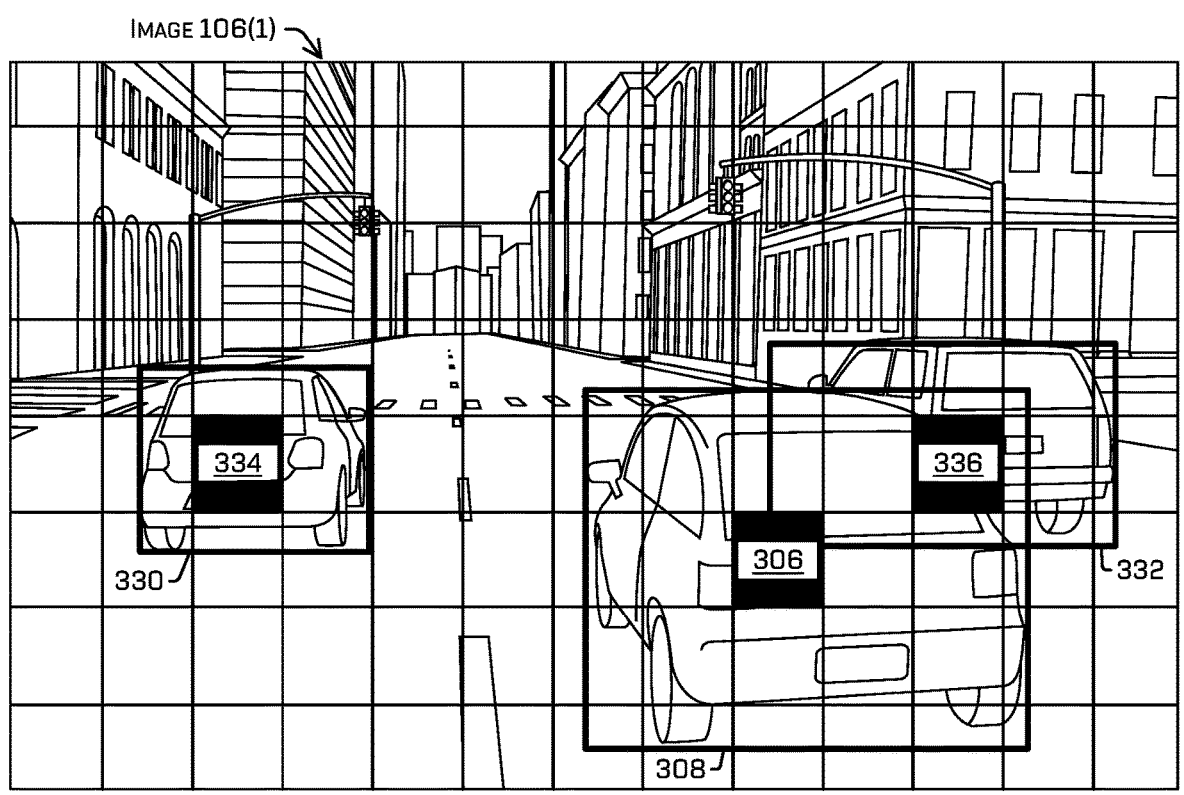
FIG. 3F illustrates example ROIs that may be output by the second ML model based at least in part on one or more feature maps comprising a plurality of ROIs and/or confidence scores.

FIG. 3F depicts a sample of ROI(s) 228 that may be output by the second ML model 208 in association with image 106(1), based at least in part on receiving concatenated feature map 224. ROI(s) 228 may comprise ROI 308, generated in association with location 306. FIG. 3F also depicts ROIs associated with the two other vehicles that appear in image 106(1) (i.e., ROI 330 and ROI 332), generated in association with two locations (i.e., location 334 and location 336, respectively). It is understood that the second ML model 208 may be trained to generate ROIs for one or more classifications of object. For example, FIG. 3F merely depicts "vehicle" detections (i.e., ROIs output by the second ML model), but the ML architecture 114 may be additionally or alternatively to output detections of one or more other classifications (e.g., pedestrians, cyclists, traffic signage, blocking vehicle).

In some examples, the second ML model 208 may be configured to perform a non-maximum suppression calculation to determine one or more ROIs to output, as output ROI(s) 228, from among a plurality of candidate ROIs generated by the second ML model 208 based at least in part on one or more feature maps received at the second ML model 208 (e.g., feature map 216, feature map 218, deformed map 222, concatenated feature map 224, and/or concatenated feature map 226). The non-maximum suppression calculation may comprise sorting the candidate ROIs associated with a received feature map (and/or concatenated map) according to the confidence scores associated therewith, selecting a first ROI associated with a highest confidence score as one of the ROIs to include in the output ROI(s) 228, removing the first ROI from the sorted list of ROIs, identifying a set of ROIs that have an IOU with the first ROI that is greater than or equal to a threshold IOU, removing the set of ROIs from the sorted list of ROIs, and repeat the process until no other ROIs remain. In some examples, the non-maximum suppression calculation may additionally or alternatively remove, from the sorted list of ROIs, any ROIs that do not meet or exceed a threshold confidence level. In some cases, this may include removing all the ROIs and not outputting any ROI and/or track. For example, this may be the case for image 106(1) for a set of candidate ROIs generated by the second ML model 208 for an anchor box associated with the classification "pedestrian." It is understood that non-maximum suppression is just one technique for selecting an appropriate ROI to output and that other suitable techniques may be used. For concatenated feature maps (that may comprise or be based at least in part on a deformed map 222), the second ML model 208 may generate candidate ROIs and/or output the ROI associated with the image that is latest in time.

Further details regarding additional or alternate examples of techniques by which the second ML model 208 may output an ROI are discussed in the next figure.

Example Detector-Tracker Output

Figure 4:
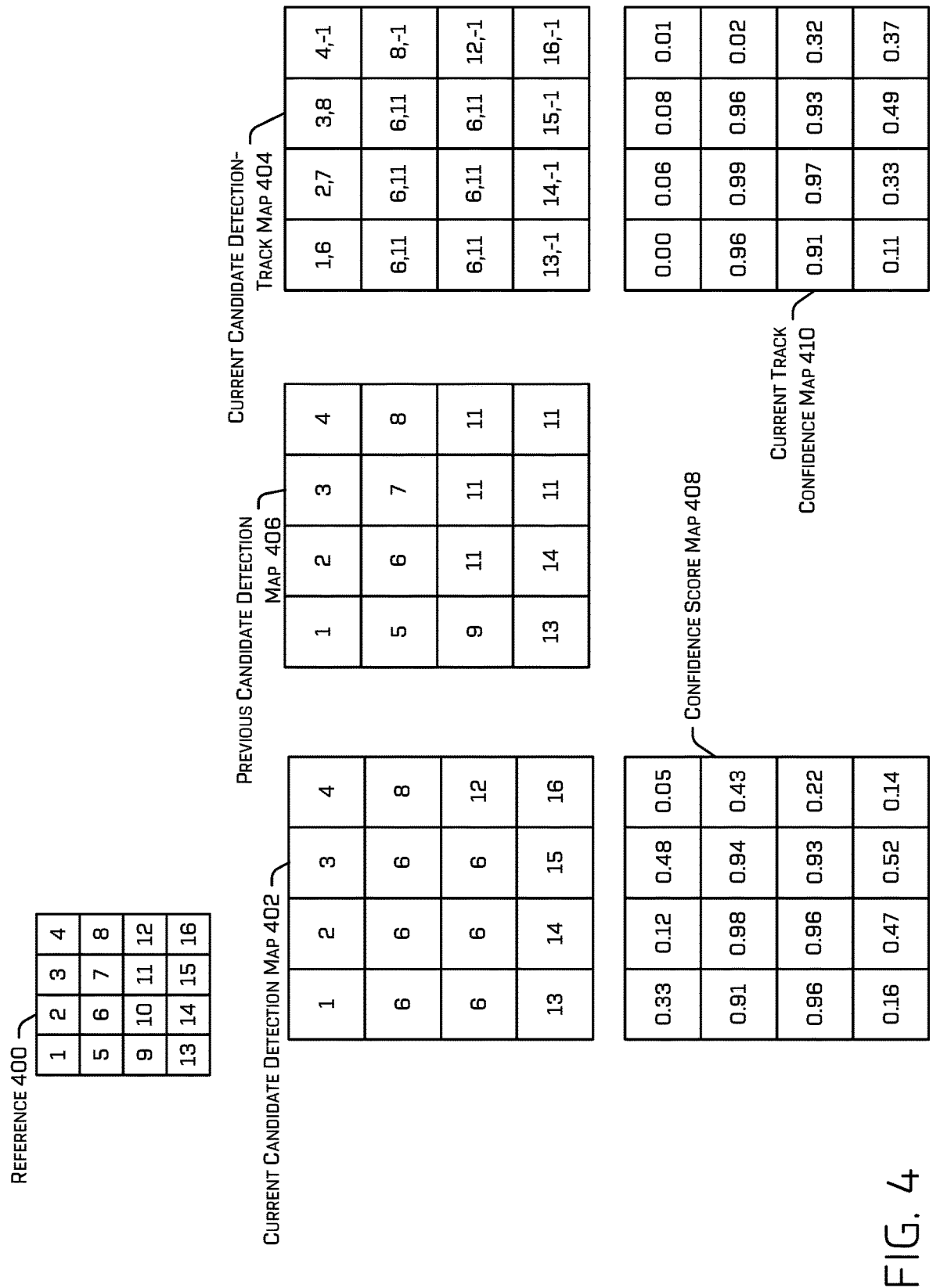
FIG. 4 illustrates an example output of the second ML model, which may comprise a map identifying an ROI for output and/or a map identifying an ROI and/or a track.

FIG. 4 illustrates an example output of the second ML model 208, which may comprise identifying an ROI for output and/or generating a track. In some examples, the output grid 300 may comprise identifiers associated with each location in the output grid 300 (and/or, correspondingly, a portion of the second ML model 208, such as a hidden and/or an output node, associated therewith). As an example, FIG. 4 includes a reference 400 that comprises identifiers associated with a subset of locations of the output grid 300. The identifiers, in this example, are the numbers 1-16, which correspond with respective different portions of the output grid 300, although any other distinct identifier may be used to identify the different locations in the output grid 300. In other words, the second ML model may generate a first candidate ROI and/or a first confidence score associated with location "1", a second candidate ROI and/or second confidence score associated with location "2", and so on. Feature map 216, feature map 218, optical flow 220, deformed map 222, concatenated feature map 224, and/or concatenated feature map 226 may have the same dimensions so that an index may reference corresponding portions of each thereof. In other words, a first identifier may universally identify a corresponding location in any of the outputs of the ML models discussed herein.

In the depicted example, location "6" of the current candidate detection map 402 is associated with a first candidate ROI that would be output according to a non-maximum suppression example and location "11" of the previous candidate detection map 406 is associated with a second candidate ROI that would be output according to a non-maximum suppression.

In some examples, the second ML model 208 may be trained to output a current candidate detection map 402 and/or a current candidate detection-track map 404 based at least in part on one or more feature maps received by the second ML model 208 (e.g., feature map 216, feature map 218, deformed map 222, concatenated feature map 224, and/or concatenated feature map 226, but, in at least one example, at least concatenated feature map 224 and/or concatenated feature map 226). For the sake of clarity, FIG. 4 also includes an illustration of a previously generated candidate detection map, i.e., previous candidate detection map 406, although, in some examples, the second ML model 208 may or may not generate a previous candidate detection map. The second ML model 208 may generate current candidate detection map 402 and/or current candidate detection-track map 404 in association with image 212. In some examples, a value indicated in a detection map may reference a location in the feature map(s) received at the second ML model 208 as input. Therefore, a value of "5" in the detection map or the detection-track may point to data associated with location "5" in at least part of the feature map.

The second ML model 208 may be trained to output the current candidate detection map 402, where a value of the current candidate detection map 402 may indicate the location identifier of another location (e.g., the value of current detection candidate map 402 at location "5" indicates the identifier "6") or may self-referentially identify the location identifier of the same location (e.g., the value of current detection candidate map 402 at location "6" indicates the identifier "6", the value of current detection candidate map 402 at location "12" indicates the identifier "12"). More specifically:

For a first ROI that would be output (as one of the ROI(s) 228) according to a non-maximum suppression determination, the second ML model 208 may be trained to populate a location in the current detection candidate map 402 that corresponds to the location for which the ROI was generated with a value that self-referentially identifies the same location (e.g., in the depicted example, if the ROI determined to be output according to a non-maximum suppression calculation was generated in association with location "6", the second ML model 208 may be trained so that location "6" in the current detection candidate map 402 has a value of "6", thereby identifying the ROI generated for location "6" to be the output ROI);

For an ROI that would be suppressed according to the non-maximum suppression determination in association with the output of the first ROI (i.e., the ROI has an IOU with the first ROI that meets or exceeds a threshold IOU), the second ML model 208 may be trained to populate a location in the current detection candidate map 402 that corresponds to a location associated with the suppressed ROI with a value that identifies the location of the first ROI (e.g., in the depicted example, such locations would include locations "5", "7", and "9"-"11", each of which identify location "6" as being associated with the ROI to output; location 316 and ROI 312 and location 322 and ROI 318 are examples of ROIs and locations that would meet this criteria); and For an ROI that would not be suppressed according to a non-maximum suppression determination, the second ML model 208 may be trained to populate a location associated with such an ROI with a value that self-referentially identifies the same location (e.g., in the depicted example, such locations would include locations "1"-4", "8", and "12"-"16"; location 328 and ROI 324 are an example of an ROI and location that would meet this criteria).

In some examples, the second ML model 208 may output an ROI of any location referenced in the current detection candidate map 402 that is associated with a confidence score (of the received feature map) that meets or exceeds a confidence score threshold (e.g., 0.85, 0.90, 0.95, 0.98, 0.99, any other suitable threshold depending on the manner in which confidence scores are generated). For example, FIG. 4 depicts a confidence score map 408 containing confidence scores associated with ROIs of respective corresponding locations. For example, location "7" of the confidence score map 408 identifies a confidence score "0.94" associated with an ROI generated based at least in part on location "7" of the input feature map(s). Again, the depiction of the confidence scores as a grid is merely for the sake of understanding the operations of the second ML model 208. The second ML model 208 may alternatively generate any other suitable data structure for representing ROIs and the confidence scores associated respectively therewith.

Assuming the confidence score threshold is 0.90 for the sake of example, based at least in part on the current detection candidate map 402, the second ML model 208 would only output the ROI associated with location "6" because candidate ROIs generated in association with locations "1"-4", "8", and "12"-"16" are associated with confidences that do not meet or exceed 0.90 (e.g., location "1" is associated with a confidence score of 0.33, location "2" with 0.12, and so on) and since locations "5"-"7" and "9"-"11" all identify location "6" the second ML model 208 would pass over locations "5", "7", and "9"-"11" and only look up the confidence score for location "6" for locations "5"-"7" and "9"-"11". Since location "6" is associated with a confidence score that meets or exceeds 0.90 (i.e., 0.98), the second ML model 208 would output the ROI associated with location "6".

Additionally or alternatively, the second ML model 208 may be trained to output a current candidate detection-track map 404, the values of which identify both the location of an ROI (according to the discussion above) and a location in a previous image, thereby forming a track. In some examples, the second ML model 208 may be trained to output the current candidate detection track map 404 and/or the current candidate detection map 402, in parallel and/or serially. The second ML model 208 may additionally or alternatively generate the previous candidate detection map 406, according to the discussion above. A depiction of the previous candidate detection map 406 is included herein for the sake of understanding the significance of the comma delimited values of current candidate detection track map 404. Second ML model 208 may not, necessarily, generate the previous candidate detection map 406 and/or retrieve it from memory, for an iteration of the second ML model 208 for the current image, although, in some examples, the second ML model 208 may do so.

Regardless, locations "10"-"12", "15", and "16" of the previous candidate detection map 406 (associated with image 214) identify location "11" as being associated with the ROI to output for image 214 (which we will assume was output for image 214 for the sake of example, by virtue of being associated with a confidence score that meets or exceeds the threshold confidence score).

A value at a location in the current candidate detection-track map 404 may indicate a first value and a second value, (depicted in this example illustration as separated by commas with the first value appearing on the left at each location). Any other representation of the association is contemplated. The first value may comprise the identifier indicated in the corresponding location in the current detection candidate map 402—in other words, the first value may be the indication determined according to the discussion above regarding the current detection candidate map 402. For example, note the location of the locations in the current detection-track map 404 that indicate "6" as a first value are locations "4"-"7" and "9"-"11", the same as in the current detection candidate map 402. The second value, depicted on the right-hand side of the comma in this example, may indicate a location in a previous image (and/or in the previous candidate detection map 406) that is associated with the location identified by the first value (on the left-hand side).

A value at a location in the current candidate detection-track map 404 may indicate a first value and a second value, separated by commas in this example with the first value appearing on the left at each location. The first value may comprise the identifier indicated in the corresponding location in the current candidate detection map 402—in other words, the first value may be the indication determined according to the discussion above regarding the current candidate detection map 402. For example, note the location of the locations in the current candidate detection-track map 404 that indicate "6" as a first value are locations "4"-"7" and "9"-"11", the same as in the current candidate detection map 402. The second value, depicted on the right-hand side of the comma in this example, may indicate a location in a previous image (and/or in the previous candidate detection map 406) that is associated with the location identified by the first value (on the left-hand side). For example, the previous location identified by the second value may be associated with a previous location of an object within a previous image, that the second ML model 208 determines to be a same object as represented in a current image.

In the illustrated example, location "5" in the current candidate detection-track map 404 indicates a value of "6,11" where "6" is the first value and "11" is the second value. This indicates, firstly, that location "5" is associated with an ROI in the current input feature map that was suppressed and the ROI generated in association with location "6" in the input feature map should be output instead. Secondly, the value "6,11" indicates that the ROI generated in association with location "6" of the current input feature map identifies an object that is the same as an object that was previously associated with location "11". Functionally, then, the second ML model 208 is thereby indicating that the current ROI generated in association with location "6" is associated with a previous ROI generated in association with location "11". This association may be at least part of a track.

On the other hand, if the second ML model 208 determines that an object identified by an ROI is not associated with an ROI in a previous image, the second ML model 208 may populate the second value with an indication that the ROI generated for the location indicated by the first value is not associated with a previous ROI and/or location. The illustrated example depicts this indication as a "−1", although any other value or indication is contemplated. The second ML model 208 may determine that an ROI generated for the location indicated by the first value is not associated with a previous ROI because the second ML model 208 because the object identified by the ROI has newly entered a FOV of the image sensor in the most recent image and/or the ROI is a low-confidence ROI that does not correspond to a salient object (e.g., such as ROI 324) since the location does not correspond with an object upon which the first ML model has been trained to output an ROI. Such a low-confidence ROI may be unlikely to match other ROIs generated by the first ML model.

The second ML model 208 may additionally or alternatively generate a current track confidence map 410 based at least in part on the input feature map, the current candidate detection map 402, current candidate detection-track map 404, and/or previous candidate detection map 406. The current track confidence map 410 may, at respective locations of current track confidence map 410, indicate a track confidence score associated with the value of the corresponding box in the current detection-track map 404. For example, a track confidence score indicated by current track confidence map 410 at location "2" (i.e., 0.06) is associated with the value at location "2" in the current candidate detection-track map 404, "2,7".

In some examples, the second ML model 208 may determine locations in the current candidate detection-track map 404 that are associated with a track confidence score that meets or exceeds a track confidence score threshold. In some examples, the second ML model 208 may make this determination by referencing the location in the current track confidence map 410 identified by the first value in the current detection-track map 404. For example, for locations "4"-"7", and "9"-"11" of the current candidate detection-track map 404 the second ML model 208 would look up the track confidence score associated with location "6" in current track confidence map 410 since locations "4"-"7", and "9"-"11" each identify location "6" as the first value. In the depicted example and according to the first value lookup described above, the second ML model 208 would determine to output a detection-track indicated by the value "6,11" if the track confidence score threshold is 0.90. The second ML model 208 may output an ROI associated with location "6" and a track identifier associated with location "11" for the previous image.

In some examples, if the second ML model 208 determines to output a detection-track value including a second value that indicates that the object is newly identified (e.g., in this example this is indicated by the value "−1"), the second ML model 208 may generate a new track identifier to associate with the ROI and/or location. For example, if the second ML model 208 determined that the ROI generated for location "11" in the previous input feature map was not associated with a location in a further-previous feature map, then the second ML model 208 may have generated a new track identifier to associate with location "11" and the previous ROI generated in association with location "11".

Since, in the depicted example, for the current candidate detection-track map 404 the second ML model 208 may output the value "6,11", the second ML model 208 may associate the track identifier previously generated for the previous ROI generated in association with location "11" of the previous image with the current ROI output in association with location "6" of the current image.

In some examples, a value output by the second ML model 208 from the current candidate detection-track map 404 may be sufficient to identify the ROI(s) 228 and/or track(s) 230. For example, the second ML model 208 may output an ROI of the input feature map based at least in part on a first value indicated by an output detection-track value (e.g., wherein the output detection-track value is "6,11", the second ML model 208 may output an ROI corresponding with location "6" in the input feature map) and a track identifier that has been newly generated or was previously generated based at least in part on the second value indicated by the output detection-track value. To further illustrate the latter point regarding track identifiers, where the second value is "−1" the second ML model 208 may generate a new track identifier and where the second value is "11" the second ML model 208 may associate, with the current image and/or the location identified by the first value, e.g., "6", the track identifier previously associated with location "11" of the previous image.

In some examples, the input feature map may comprise a feature map per anchor and/or classification, so the second ML model 208 may generate the current candidate detection map 402, the current candidate detection-track map 404, the previous candidate detection map 406, confidence score map 408, and/or the current track confidence map 410 for one or more anchors, meaning that there may be a set of maps 402-410 generated by the second ML model 208 per anchor/classification. In some examples, values indicated by the detection maps and detection-track map discussed herein may comprise additional or alternative identifiers to identify an appropriate portion of an input feature map (e.g., location "5" of a current portion of feature map, location "5" of a warped portion of a feature map, location "5" of a current portion of a feature map generated for "pedestrian" classification).

In some examples, the second ML model 208 may be trained to output the current candidate detection map 402, the current candidate detection-track map 404, the previous candidate detection map 406, confidence score map 408, and/or the current track confidence map 410 based at least in part on a training data set that comprises sets of images captured sequentially in time and ground truth data that indicates a ground truth ROI (e.g., which may comprise a ground truth offset coordinates and/or ground truth extents of the ROI) which corresponds to a location that should be associated with the output ROI, e.g., a detection map value and/or a first (left-hand) value of a detection-track map), a ground truth track between a point in a first image and a point in a second (previous) image (e.g., a ground truth detection-track value), and/or ground truth confidence scores (e.g. "1" for locations associated with a center of an object, "0" for locations not associated with an object; "1" for correct tracks, "0" for incorrect tracks). Training the second ML model 208 may comprise determining losses between data generated by the second ML model 208 compared to the ground truth data and adjusting parameters (e.g., weights) of the first ML model 200 and/or the second ML model 208 to minimize the losses.

Example Optical Flow Model Operation

Figure 5A:
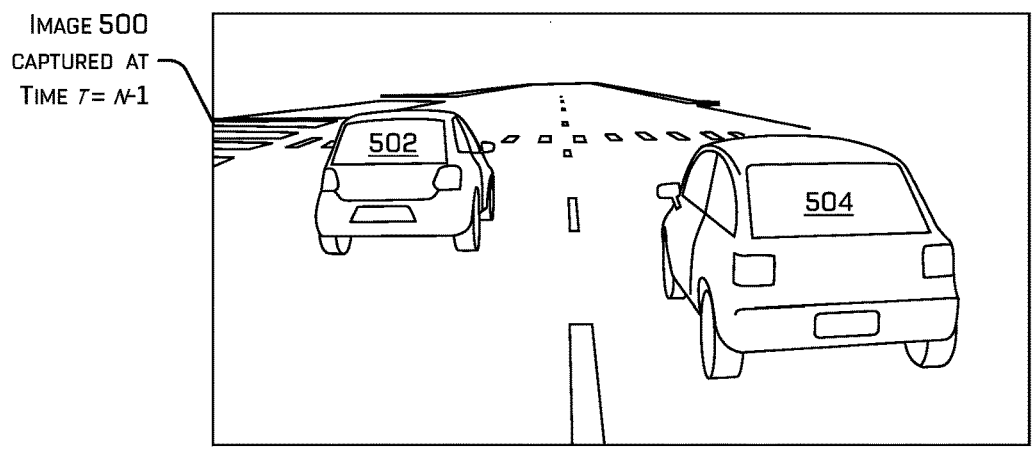
FIGS. 5A and 5B illustrate example images taken sequentially in time.
Figure 5B:
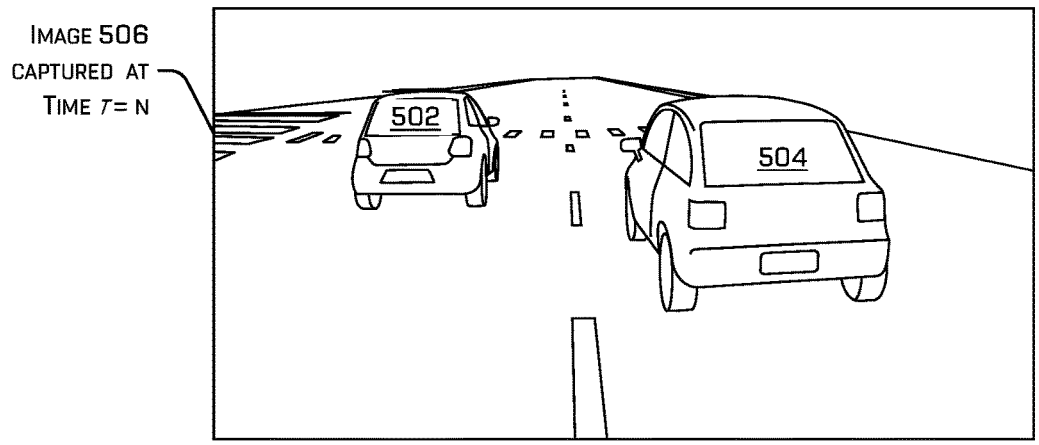
Figure 5C:
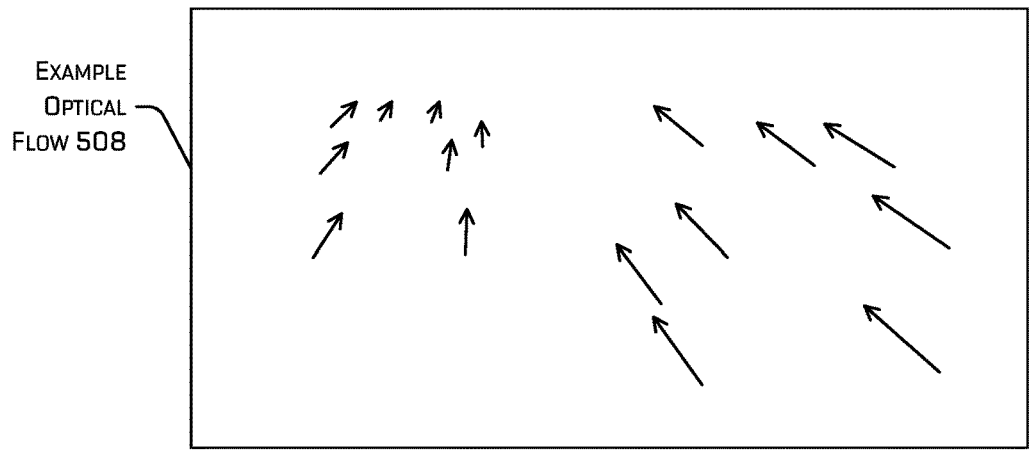
FIG. 5C illustrates an example optical flow between the example images depicted in FIGS. 5A and 5B.

FIG. 5A depicts an example image 500 captured at time t=n−1, which may represent image 214. The example image 500 includes portions that represent depicting a first vehicle 502 and a second vehicle 504. FIG. 5B depicts an example image 506 captured at time t=n, which may represent image 212. Example image 506 also depicts first vehicle 502 and second vehicle 504, but the relative position of the portions of the example image 506 that represent the first vehicle 502 and the second vehicle 504 have shifted relative to those of example image 500.

The optical flow model 202 discussed herein may be trained to output an optical flow 220, such as the example optical flow 508, based at least in part on receiving a first image and a second image, such as example image 500 and example image 506. In some examples, training the optical flow model 202 may comprise generating a ground truth optical flow between the first image and the second image using a computationally-expensive algorithm (e.g., Lucas-Kanade, Open CV's optical flow library) that may not be suitable for real-time computation. Training the optical flow model 202 may additionally or alternatively comprise determining an optical flow based at least in part on receiving the first image and the second image, determining a loss between the optical flow determined by the optical flow model 202 and the ground truth optical flow, and re-weighting and/or otherwise adjusting components of the optical flow model 202 to minimize the loss.

In some examples, the optical flow 220 generated by the optical flow model 202 may comprise a vector field. In some examples, the optical flow 220 may indicate displacement and/or rotation of an object relative to an image plane of the image sensor that captured the first image and the second image. To reduce the size of the data of the optical flow 220 and/or to reduce computation required to deform the feature map 218 at the deformation component 204, the optical flow model 202 may additionally or alternatively prune or otherwise reduce the vector field. In some examples, the optical flow 220 may be downsized to match dimensions of feature map 218. For example, the optical flow model 202 may downsize the vector field according to the following expression (where k is a constant):

$$\frac{\sum_{i,j} \overrightarrow{v_{t,j}} \|\overrightarrow{v_{t,j}}\|^k}{\sum_{i,j} \|\overrightarrow{v_{t,j}}\|^k}$$

The expression may be evaluated per patch (e.g., i and j are iterated over one or more patches or regions) such that the resultant vector is indicative of the downsized optical flow for a given region. Increasing the value of k may isolate the object representation that has appeared to move the most between the images. For example, at k=0 the above-mentioned equation averages over the vector field, whereas as k→∞, the result of the calculation will be the vector with the largest normal value. Setting k=2 may result in isolating salient vectors from minor movements (e.g., salient objects may tend to move more than non-salient objects, but keeping k sufficiently low may ensure that other movements may still be captured by the resultant optical flow). The example optical flow 508 depicts an example optical flow downsized according to the equation above set with a high k-value (e.g., greater than 10). Without conducting such downsizing, the vector field may comprise as many vectors as there are pixels in one of the input images.

In some examples, the images provided to the optical flow model 202 may be provided at a full resolution. However, in some cases, the first ML model 200 may output feature maps having a resolution that is downscaled in comparison to the original resolution of image 212 and image 214. Optical flow model 202 may downscale the optical flow 220 to match a resolution of the feature map 216 and/or feature map 218.

In some examples, the deformation component 204 may receive a feature map 218 and may deform the feature map 218, based at least in part on the optical flow 220, to obtain a deformed map 222. For example, the deformation component 204 may displace data associated with a first location in the feature map 218 to a second location within the feature map 218 based at least in part on a magnitude and direction of a vector indicated in the optical flow 220 that originates at or near the first location and terminates at or near the second location. In some examples, the deformation component 204 may additionally or alternatively deform the data associated with a displaced location. For example, the deformation component 204 may scale, rotate, keystone, and/or otherwise modify an ROI associated with the first location based at least in part on one or more vectors of the optical flow 220. In at least some examples, the optical flow 508 may be scaled (up or down) and/or otherwise modified to have the same dimensions of the one or more output feature maps.

The deformed map 222 may be concatenated with the feature map 216, as concatenated feature map 224, and provided as input to the second ML model 208.

Example Process

Figure 6:
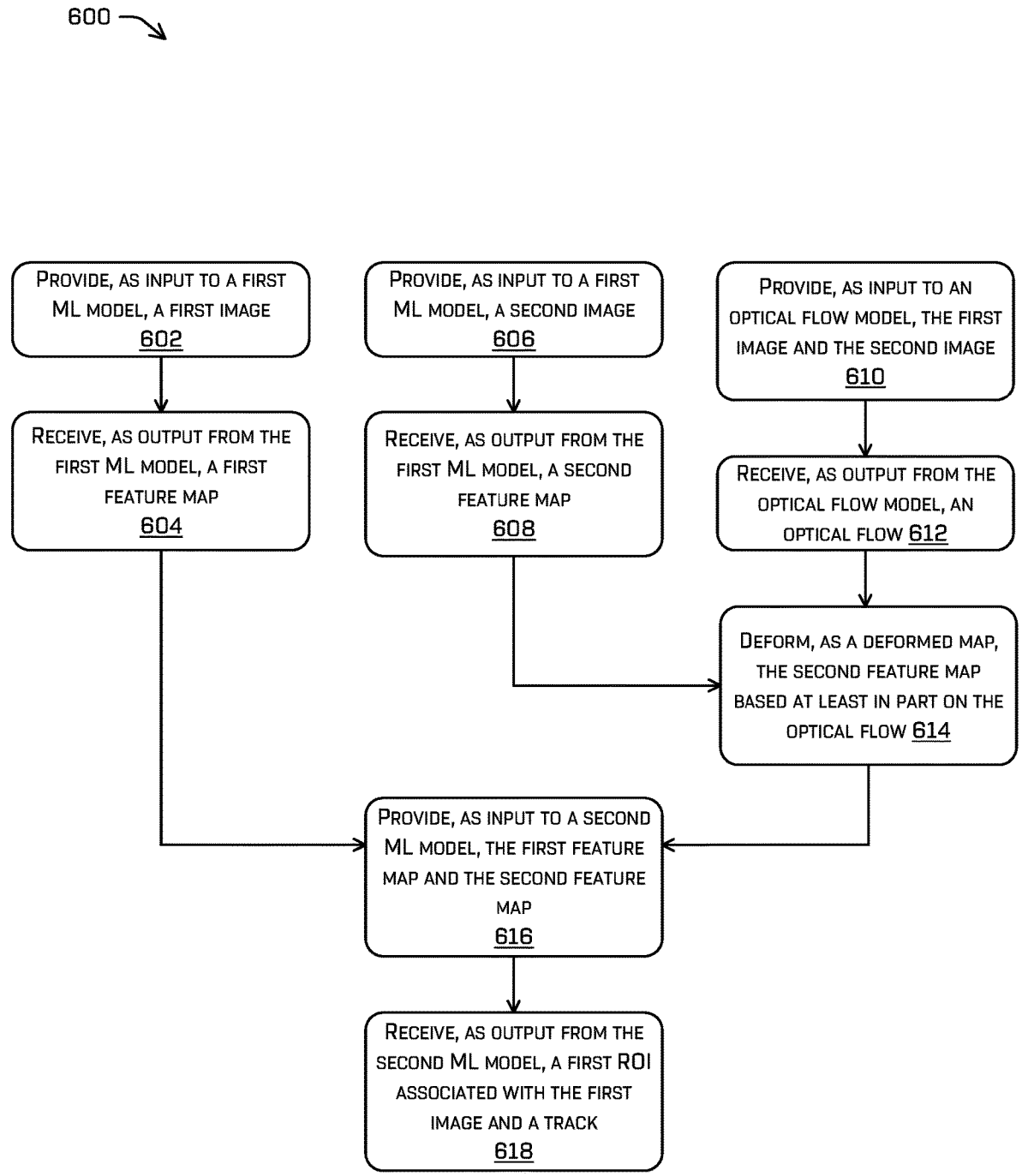
FIG. 6 illustrates a flow diagram of an example process for detecting and/or tracking objects represented in sensor data based at least in part on feature maps that comprise temporal context.

FIG. 6 illustrates an example process 600 for detecting and/or tracking objects represented in sensor data based at least in part on feature maps that comprise temporal context. In some examples, example process 600 may be accomplished by component(s) of ML architecture 114. Although the following description discusses images, it is understood that the techniques described below may additionally or alternatively other forms of sensor data such as, for example, LIDAR data, RADAR data, and/or other forms of data that may identify the existence of an object in an environment surrounding the sensor.

At operation 602, example process 600 may comprise providing, as input to a first ML model, a first image, according to any of the techniques discussed herein. For example, the first ML model may be first ML model 200 and the first image may be image 212.

At operation 604, example process 600 may comprise receiving, as output from the first ML model, a first feature map, according to any of the techniques discussed herein. For example, the first feature map may represent feature map 216.

At operation 606, example process 600 may comprise providing, as input to a first ML model, a second image, according to any of the techniques discussed herein. For example, the second image may represent image 214.

At operation 608, example process 600 may comprise receiving, as output from the first ML model, a second feature map, according to any of the techniques discussed herein. For example, the second feature map may represent feature map 218.

In an example where the first image is captured at a time later than the second image, operation 606 and/or operation 608 may occur before operation 602 and/or operation 604. In some examples, the second feature map may be stored in a memory for subsequent retrieval and further processing (e.g., since the first feature map may not exist at the time the second feature map was received). In an additional or alternate example, operations 606 and/or 608 may occur substantially parallel to operations 602 and/or 604.

At operation 610, example process 600 may comprise providing, as input to an optical flow model, the first image and the second image, according to any of the techniques discussed herein.

At operation 612, example process 600 may comprise receiving, as output from the optical flow model, an optical flow, according to any of the techniques discussed herein. In some examples, the optical flow model may downsize and/or down-scale the optical flow, as discussed further above.

At operation 614, example process 600 may comprise deforming, as a deformed map, the second feature map based at least in part on the optical flow, according to any of the techniques discussed herein. For example, deforming the feature map may comprise displacing data associated with a first location in the feature map to a second location in the feature map and/or warping the data itself (e.g., rotating, keystoning, compressing, scaling, rotating an ROI and/or other feature(s) of the feature map). In some examples, data of the feature map that are displaced outside a range of the deformed feature map may be deleted or collected at edges of the range. In some examples, operations 602, 606, and 610, and/or 604, 608, 612, and/or 614 may be conducted substantially simultaneously.

At operation 616, example process 600 may comprise providing, as input to a second ML model, the first feature map and the second feature map, according to any of the techniques discussed herein. The second ML model may represent second ML model 208. Providing the first feature map and the second feature map to the second ML model as input may comprise concatenating the first feature map and the second feature map, concatenating the first feature map and the deformed map, and/or aggregating outputs from one or more layers of the first ML model.

At operation 618, example process 600 may comprise receiving, as output from the second ML model at least a first ROI associated with the first image and a track, according to any of the techniques discussed herein. In some examples, the second ML model may additionally or alternatively output a second ROI associated with the second image. The track output by the second ML model may comprise at least an indication that the first ROI (and/or a first location associated with the first ROI) is associated with an object that has not previously been identified by the second ML model (e.g., the track is a new track) or that the first ROI is associated with a second ROI and/or a second location associated with a previous image (e.g., the track is associated with a known track, the object has been detected in a previous image).

Example System

Figure 7:
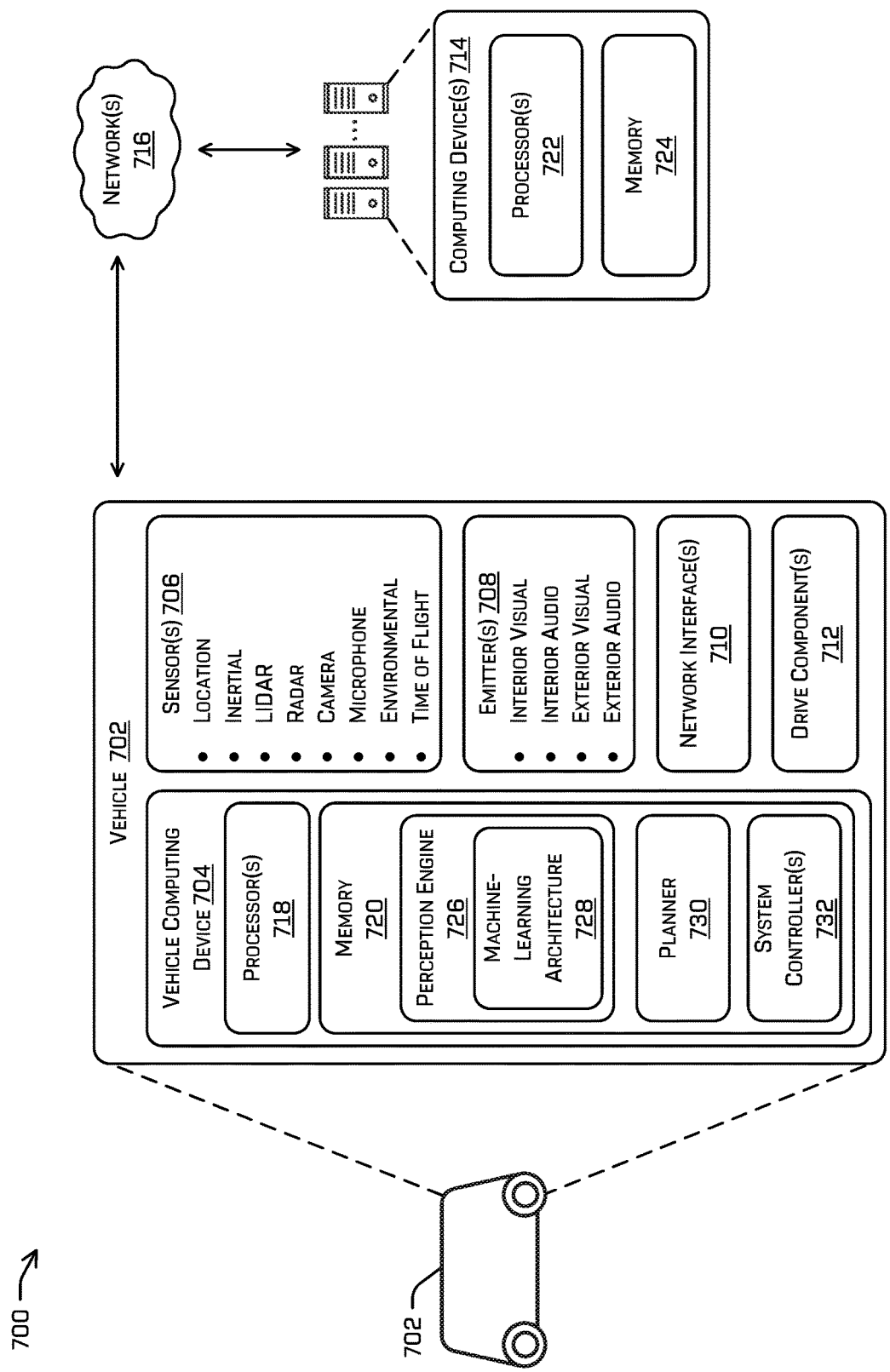
FIG. 7 illustrates a block diagram of an example system for detecting and/or tracking objects represented in sensor data based at least in part on feature maps that comprise temporal context.

FIG. 7 illustrates a block diagram of an example system that implements the techniques discussed herein. In some instances, the system 700 may include a vehicle 702, which may correspond to the autonomous vehicle 102 in FIG. 1. In some instances, the vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 702 may be a fully or partially autonomous vehicle having any other level or classification. Moreover, in some instances, the techniques described herein may be usable by non-autonomous vehicles as well. It is contemplated that the techniques discussed herein may apply to more than robotic control, such as for autonomous vehicles. For example, the techniques discussed herein may be applied to video games, manufacturing, augmented reality, etc.

The vehicle 702 may include a vehicle computing device 704, one or more sensor(s) 706, one or more emitters 708, one or more network interfaces 710, and/or one or more drive components 712.

In some instances, the sensor(s) 706 may include LIDAR sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., temperature sensors, humidity sensors, light sensors, pressure sensors, etc.), etc. The sensor(s) 706 may include multiple instances of each of these or other types of sensors. For instance, the LIDAR sensors may include individual LIDAR sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device 704.

The vehicle 702 may also include emitter(s) 708 for emitting light and/or sound, as described above. The emitter(s) 708 in this example may include interior audio and visual emitter(s) to communicate with passengers of the vehicle 702. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 702 may also include network interface(s) 710 that enable communication between the vehicle 702 and one or more other local or remote computing device(s). For instance, the network interface(s) 710 may facilitate communication with other local computing device(s) on the vehicle 702 and/or the drive component(s) 712. Also, the network interface (s) 710 may additionally or alternatively allow the vehicle to communicate with other nearby computing device(s) (e.g., other nearby vehicles, traffic signals, etc.). The network interface(s) 710 may additionally or alternatively enable the vehicle 702 to communicate with a computing device(s) 714. In some examples, computing device(s) 714 may comprise one or more nodes of a distributed computing system (e.g., a cloud computing architecture).

The network interface(s) 710 may include physical and/or logical interfaces for connecting the vehicle computing device 704 to another computing device or a network, such as network(s) 716. For example, the network interface(s) 710 may enable Wi-Fi-based communication such as via frequencies defined by the IEEE 800.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device 704 and/or the sensor(s) 706 may send sensor data, via the network(s) 716, to the computing device(s) 714 at a particular frequency, after a lapse of a predetermined period of time, in near real-time, etc.

In some instances, the vehicle 702 may include one or more drive components 712. In some instances, the vehicle 702 may have a single drive component 712. In some instances, the drive component(s) 712 may include one or more sensors to detect conditions of the drive component(s) 712 and/or the surroundings of the vehicle 702. By way of example and not limitation, the sensor(s) of the drive component(s) 712 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, LIDAR sensors, RADAR sensors, etc. Some sensors, such as the wheel encoders may be unique to the drive component(s) 712. In some cases, the sensor(s) on the drive component(s) 712 may overlap or supplement corresponding systems of the vehicle 702 (e.g., sensor(s) 706).

The drive component(s) 712 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 712 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 712. Furthermore, the drive component(s) 712 may also include one or more communication connection(s) that enable communication by the respective drive component with one or more other local or remote computing device(s).

The vehicle computing device 704 may include one or more processors 718 and memory 720 communicatively coupled with the one or more processors 718. Computing device(s) 714 may additionally or alternatively include processor(s) 722, and/or memory 724. The processor(s) 718 and/or 722 may be any suitable processor capable of executing instructions to process data and perform operations as described herein. By way of example and not limitation, the processor(s) 718 and/or 722 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 720 and/or 724 may be examples of non-transitory computer-readable media. The memory 720 and/or 724 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 720 and/or memory 724 may store a perception engine 726, which may comprise an ML architecture 728, a planner 730, and/or system controller(s) 732. Perception engine 726 may represent perception engine 110, ML architecture 728 may include and/or represent ML architecture 114, and planner 730 may represent planner 112. In some instances, perception engine 726 may comprise a primary perception system, a secondary perception system, a prediction system, and/or a localization system. The memory 720 and/or 724 may additionally or alternatively store a mapping system, a planning system, a ride management system, etc. Although perception engine 726 and ML architecture 728 are illustrated as being stored in memory 720, perception engine 726 and/or ML architecture 728 may be stored in memory 724 and/or may include processor-executable instructions, machine-learned model(s), and/or hardware.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

Memory 720 may additionally or alternatively store one or more system controller(s) 732 (which may additionally or alternatively be implemented as hardware), which may be configured to control steering, propulsion, braking, safety, emitters, communication, and other systems of the vehicle 702. These system controller(s) 732 may communicate with and/or control corresponding systems of the drive component(s) 712 and/or other components of the vehicle 702. For example, the planner 730 may generate instructions based at least in part on a classification, sub-classification, and/or ROI generated by the perception engine 726 and transmit the instructions to the system controller(s) 732, which may control operation of the vehicle 702 based at least in part on the instructions.

It should be noted that while FIG. 7 is illustrated as a distributed system, in alternative examples, components of the vehicle 702 may be associated with the computing device(s) 714 and/or components of the computing device(s) 714 may be associated with the vehicle 702. That is, the vehicle 702 may perform one or more of the functions associated with the computing device(s) 714, and vice versa.

Example Clauses

A. A method comprising: inputting a first image to a first machine-learned (ML) model; receiving, from the first ML model and based at least in part on the first image, first intermediate values; inputting a second image to the first ML model; receiving, from the first ML model and based at least in part on the second image, second intermediate values; modifying, as deformed intermediate values, the second intermediate values; inputting the first intermediate values and the deformed intermediate values into a second ML model; and receiving, as output from the second ML model: a region of interest (ROI), wherein the ROI identifies at least a portion of the first image as being associated with an object; and a track associated with the ROI, wherein the track comprises a first indication of a first location in the first image associated with the ROI and a second indication of a second location in the second image.

B. The method as paragraph recites A, wherein modifying the second intermediate values comprises: inputting the first image and the second image to an optical flow model; receiving, as output from the optical flow model, an indication of optical flow between the first image and the second image; and deforming, as the deformed intermediate values, the second intermediate values based at least in part on the indication of optical flow.

C. The method as paragraph A or B recites, wherein the second ML model: determines a plurality of candidate ROIs associated with the object; determines a plurality of candidate tracks associated with the plurality of candidate ROIs, where an individual candidate ROI of the plurality of candidate ROIs is associated with an individual track of the plurality of candidate tracks; selects the ROI, from among the plurality of candidate ROIs, based at least in part on a non-maximum suppression calculation; and outputs the ROI and the track based at least in part on the selection.

D. The method as any one of paragraphs A-C recites, wherein: the first intermediate values comprise a first feature map and the second intermediate values comprise a second feature map; the first feature map is received from a first detection portion of the first ML model; the second feature map is received from a second detection portion of the first ML model; the first detection portion comprises a first structure associated with first parameters; the second detection portion comprises a second structure associated with second parameters; the first structure and the second structure are the same; and the first parameters and the second parameters are different.

E. The method as any one of paragraphs A-D recites, further comprising controlling an autonomous vehicle based at least in part on the ROI and/or the track.

F. A system comprising: one or more processors; and a memory storing processor-executable instructions that, when executed by the one or more processors, cause the one or more processors to perform operations comprising: providing, as input to a first machine-learned (ML) model, a first image; receiving, from the first ML model and based at least in part on the first image, first intermediate values; providing, as input to a first ML model, a second image; receiving, from first ML model and based at least in part on the second image, second intermediate values; providing, as input to a second ML model, at least the first intermediate values; and receiving, from the second ML model: a region of interest (ROI) associated with an object represented in the first image; and a track associated with the ROI.

G. The system as paragraph F recites, wherein the operations further comprise: providing, as input to an optical flow model, the first image and the second image; receiving, as output from the optical flow model, an indication of optical flow between the first image and the second image; and modifying, as a deformed intermediate values, the second intermediate values based at least in part on the indication of optical flow, wherein providing the first feature map as input to the second ML model comprises concatenating the first intermediate values with the deformed intermediate values and providing the concatenated intermediate values as input to the second ML model.

H. The system as paragraph F or G recites, wherein: the indication of optical flow comprises a vector field; and at least one of deforming the second intermediate values comprises mapping data associated with a first location in the second intermediate values to a second location in the deformed intermediate values, or downsizing the vector field.

I. The system as any one of paragraphs F-H recites, wherein the second ML model: determines, based at least in part on the concatenated intermediate values, a plurality of candidate ROIs associated with the object; determines, based at least in part on the concatenated feature map, a plurality of candidate tracks associated with the plurality of candidate ROIs, where an individual candidate ROI of the plurality of candidate ROIs is associated with an individual track of the plurality of candidate tracks; selects the ROI, from among the plurality of candidate ROIs, based at least in part on a non-maximum suppression calculation; and outputs the ROI and the track based at least in part on the selection.

J. The system as any one of paragraphs F-I recites, wherein the second ML model: determines a plurality of candidate ROIs associated with the object; selects the ROI, from among the plurality of candidate ROIs, based at least in part on a non-maximum suppression calculation; and outputs the ROI and the track based at least in part on the selection.

K. The system as any one of paragraphs F-J recites, wherein: the first intermediate values comprise a first feature map and the second intermediate values comprise a second feature map; the first feature map is received from a first detection portion of the first ML model; the second feature map is received from a second detection portion of the first ML model; the first detection portion comprises a first structure associated with first parameters; the second detection portion comprises a second structure associated with second parameters; the first structure and the second structure are the same; and the first parameters and the second parameters are different.

L. The system as any one of paragraphs F-K recites, wherein the track comprises a first indication of a first location in the first image associated with the ROI and a second indication of a second location in the second image.

M. The system as any one of paragraphs F-L recites, wherein the second ML model is trained according to the operations comprising: receiving a first ground truth ROI associated with a third image; receiving a second ground truth ROI associated with a fourth image; receiving a third ground truth indicating an association between the first ground truth ROI and the second ground truth ROI; determining a first loss based at least in part on a difference between the first ground truth ROI and the ROI; determining a second loss based at least in part on a difference between the track and the third ground truth; and altering one or more parameters of at least one of the first ML model or the second ML model to minimize at least one of the first loss or the second loss.

N. A non-transitory computer-readable medium storing computer-executable instructions that, when executed by one or more processors, cause the one or more processors to perform operations comprising: providing, as input to a first machine-learned (ML) model, first sensor data; receiving, from the first ML model and based at least in part on the first sensor data, first intermediate values; providing, as input to the first ML model, second sensor data; receiving, from the first ML model and based at least in part on the second sensor data, second intermediate values; providing, as input to a second ML model, at least the first intermediate values; and receiving, as output from the second ML model: a region of interest (ROI) associated with an object represented in the first sensor data; and a track associated with the ROI.

O. The non-transitory computer-readable medium as paragraph N recites, wherein the first sensor data comprises a first image, wherein the second sensor data comprises a second image, and wherein the operations further comprise: providing, as input to an optical flow model, the first image and the second image; receiving, as output from the optical flow model, an indication of optical flow between the first image and the second image; and deforming, as deformed intermediate values, the second intermediate values based at least in part on the indication of optical flow.

P. The non-transitory computer-readable medium as paragraph N or O recites, wherein the first intermediate values comprise a first feature map and second intermediate values comprise a second feature map, and wherein the operations further comprise concatenating, as a concatenated feature map, the first feature map and the deformed feature map, and wherein providing, as input to the second ML model, the first feature map comprises providing as input the concatenated feature map to the second ML model.

Q. The non-transitory computer-readable medium as any one of paragraphs N-P recites, wherein: the first intermediate values are received from a first detection portion of the first ML model; the second intermediate values are received from a second detection portion of the first ML model; the first detection portion comprises a first structure associated with first parameters; the second detection portion comprises a second structure associated with second parameters; the first structure and the second structure are the same; and the first parameters and the second parameters are different.

R. The non-transitory computer-readable medium as any one of paragraphs N-Q recites, wherein the track comprises a first indication of a first location in the first sensor data associated with the ROI and a second indication of a second location in the second sensor data.

S. The non-transitory computer-readable medium as any one of paragraphs N-R recites, wherein the second ML model: determines a plurality of candidate ROIs associated with the object; selects the ROI, from among the plurality of candidate ROIs, based at least in part on a non-maximum suppression calculation; and outputs the ROI and the track based at least in part on the selection.

T. The non-transitory computer-readable medium as any one of paragraphs N-S recites, wherein the second ML model is trained according to operations comprising: receiving a first ground truth ROI associated with a third image; receiving a second ground truth ROI associated with a fourth image; receiving a third ground truth indicating an association between the first ground truth ROI and the second ground truth ROI; determining a first loss based at least in part on a difference between the first ground truth ROI and the ROI; determining a second loss based at least in part on a difference between the track and the third ground truth; and altering one or more parameters of at least one of the first ML model or the second ML model to minimize at least one of the first loss or the second loss.

U. An autonomous vehicle comprising at least one of the system as any one of paragraphs F-M recites or the non-transitory computer-readable medium as any one of paragraphs N-T recites.

V. At least one of a device, autonomous vehicle, system, or non-transitory computer-readable medium that accomplishes operations of the method as recited in any one of paragraphs A-E.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   providing, as first input to a first machine-learned model, first image data representing an object;
   generating, by the first machine-learned model and based at least in part on the first image data, first intermediate data;
   providing, as second input to the first machine learned model, second image data;
   generating, by the first machine-learned model and based at least in part on the second image data, second intermediate data;
   determining, based at least in part on the first intermediate data and the second intermediate data, a respective location of the object in the first image data and the second image data; and
   controlling an autonomous vehicle based at least in part on the respective location of the object in the first image data and the second image data.

2. The method of claim 1, further comprising:
   determining, based at least in part on the first image data and the second image data, an optical flow;
   wherein the respective location of the object in the first image data and the second image data is based at least in part on the optical flow.

3. The method of claim 1, wherein a location of the object in the first image data is determined based at least in part on a plurality of candidate regions of interest and a non-maximum suppression calculation.

4. The method of claim 1, wherein the determining the respective location of the object in the first image data and the second image data is by a second machine-learned model.

5. The method of claim 1, wherein determining the respective location of the object in the first image data and the second image data comprises deforming the second intermediate data based on an optical flow.

6. A system comprising:
   one or more processors; and
   one or more non-transitory computer-readable media storing processor-executable instructions that, when executed by the one or more processors, cause the system to perform operations comprising:
      providing, as first input to a first machine-learned model, first image data representing an object;
      generating, by the first machine-learned model and based at least in part on the first image data, first intermediate data;
      providing, as second input to the first machine-learned model, second image data;
      generating, by the first machine-learned model and based at least in part on the second image data, second intermediate data;
      determining, based at least in part on the first intermediate data and the second intermediate data, a respective location of the object in the first image data and the second image data; and
      controlling an autonomous vehicle based at least in part on the respective location of the object in the first image data and the second image data.

7. The system of claim 6, the operations further comprising:
   determining, based at least in part on the first image data and the second image data, an optical flow;
   wherein the respective location of the object in the first image data and the second image data is based at least in part on the optical flow.

8. The system of claim 7, wherein:
   the optical flow comprises a vector field.

9. The system of claim 6, the operations further comprising:
   determining, based at least in part on the first intermediate data or the second intermediate data, a candidate region of interest data associated with the object; and
   determining, based at least in part on the first intermediate data or the second intermediate data, candidate tracking data associated with the candidate region of interest data, where an individual candidate region of interest of the candidate region of interest data is associated with an individual track of the candidate tracking data.

10. The system of claim 6, wherein a location of the object in the first image data is determined based at least in part on a plurality of candidate regions of interest and a non-maximum suppression calculation.

11. The system of claim 6, wherein:
    the first intermediate data comprises a first feature map; and
    the second intermediate data comprises a second feature map.

12. The system of claim 6, the operations further comprising:
    determining tracking data associated with the object.

13. The system of claim 6, wherein the determining the respective location of the object in the first image data and the second image data is by a second machine-learned model.

14. One or more non-transitory computer-readable media storing computer-executable instructions that, when executed by one or more processors, cause the one or more processors to perform operations comprising:
- providing, as first input to a first machine-learned model, first sensor data representing an object;
- generating, by the first machine-learned model and based at least in part on the first sensor data, first intermediate data;
- providing, as second input to the first machine-learned model, second sensor data;
- generating, by the first machine-learned model and based at least in part on the second sensor data, second intermediate data;
- determining, based at least in part on the first intermediate data and the second intermediate data, a respective location of the object in the first sensor data and the second sensor data; and
- controlling an autonomous vehicle based at least in part on the respective location of the object in the first sensor data and the second sensor data.

15. The one or more non-transitory computer-readable media of claim 14, wherein the first sensor data comprises a first image, wherein the second sensor data comprises a second image, and wherein the operations further comprise:
- determining, based at least in part on the first image and the second image, an optical flow;
- wherein the respective location of the object in the first sensor data and the second sensor data is based at least in part on the optical flow.

16. The one or more non-transitory computer-readable media of claim 14, wherein:
- the first intermediate data comprises a first feature map; and
- the second intermediate data comprises a second feature map.

17. The one or more non-transitory computer-readable media of claim 14, wherein determining the respective location of the object in the first sensor data and the second sensor data is by a second machine-learned model.

18. The one or more non-transitory computer-readable media of claim 14, wherein:
- the first intermediate data is received from a first detection portion of the first machine-learned model; and
- the second intermediate data is received from a second detection portion of the first machine-learned model.

19. The one or more non-transitory computer-readable media of claim 14, wherein a location of the object in the first sensor data is determined based at least in part on a plurality of candidate regions of interest and a non-maximum suppression calculation.

20. The one or more non-transitory computer-readable media of claim 14, the operations further comprising:
- determining, based at least in part on the first intermediate data and the second intermediate data, a region of interest associated with the object;
- wherein the region of interest is associated with the respective location of the object in the first sensor data and the second sensor data.

* * * * *